(12) United States Patent
Yano

(10) Patent No.: US 11,914,909 B2
(45) Date of Patent: Feb. 27, 2024

(54) STORAGE MEDIUM STORING CONTROL PROGRAM THAT CONTROLS PRINTING APPARATUS INCLUDING AT LEAST ONE SHEET STORAGE UNIT, AND CONTROL METHOD PRELIMINARY CLASS

(71) Applicant: CANON KABUSHIKI KAISHA, Tokyo (JP)

(72) Inventor: Takaaki Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/058,975

(22) Filed: Nov. 28, 2022

(65) Prior Publication Data
US 2023/0195394 A1    Jun. 22, 2023

(30) Foreign Application Priority Data
Dec. 16, 2021    (JP) .................................. 2021-204535

(51) Int. Cl.
G06F 3/12    (2006.01)
(52) U.S. Cl.
CPC .......... *G06F 3/1253* (2013.01); *G06F 3/1285* (2013.01)
(58) Field of Classification Search
CPC ............................ G06F 3/1253; G06F 3/1285
See application file for complete search history.

(56) References Cited

U.S. PATENT DOCUMENTS

| | | | |
|---|---|---|---|
| 11,414,283 B2 | 8/2022 | Kawamura et al. | |
| 2012/0120443 A1* | 5/2012 | Aritomi | G06F 3/1287 358/1.15 |
| 2017/0078511 A1* | 3/2017 | Hasegawa | G06F 3/1285 |
| 2019/0329995 A1* | 10/2019 | Kawamura | G03G 15/5079 |
| 2020/0036849 A1* | 1/2020 | Kimura | H04N 1/00779 |
| 2020/0264821 A1* | 8/2020 | Ooba | G06F 3/1282 |
| 2020/0314275 A1* | 10/2020 | Igarashi | H04N 1/00692 |

FOREIGN PATENT DOCUMENTS

JP    2019188691 A    10/2019

* cited by examiner

*Primary Examiner* — Helen Zong
(74) *Attorney, Agent, or Firm* — ROSSI, KIMMS & McDOWELL LLP

(57) ABSTRACT

A user interface corresponding to a startup environment of a paper management application is provided. A non-transitory computer-readable storage medium storing a control program for causing a computer to execute a process that controls a printing apparatus including at least one sheet storage unit, the process comprising in a case that an application for operating the printing apparatus, which is installed in a printing control apparatus capable of communicating with the printing apparatus, is running, causing a display unit to selectably display an object, which accepts an instruction for opening the sheet storage unit, via an operation unit of the printing control apparatus, and in a case that the application, which is installed in an information processing apparatus capable of communicating with the printing apparatus via the printing control apparatus, is running, restricting accepting selection of the object via an operation unit of the information processing apparatus.

6 Claims, 21 Drawing Sheets

FIG. 5A

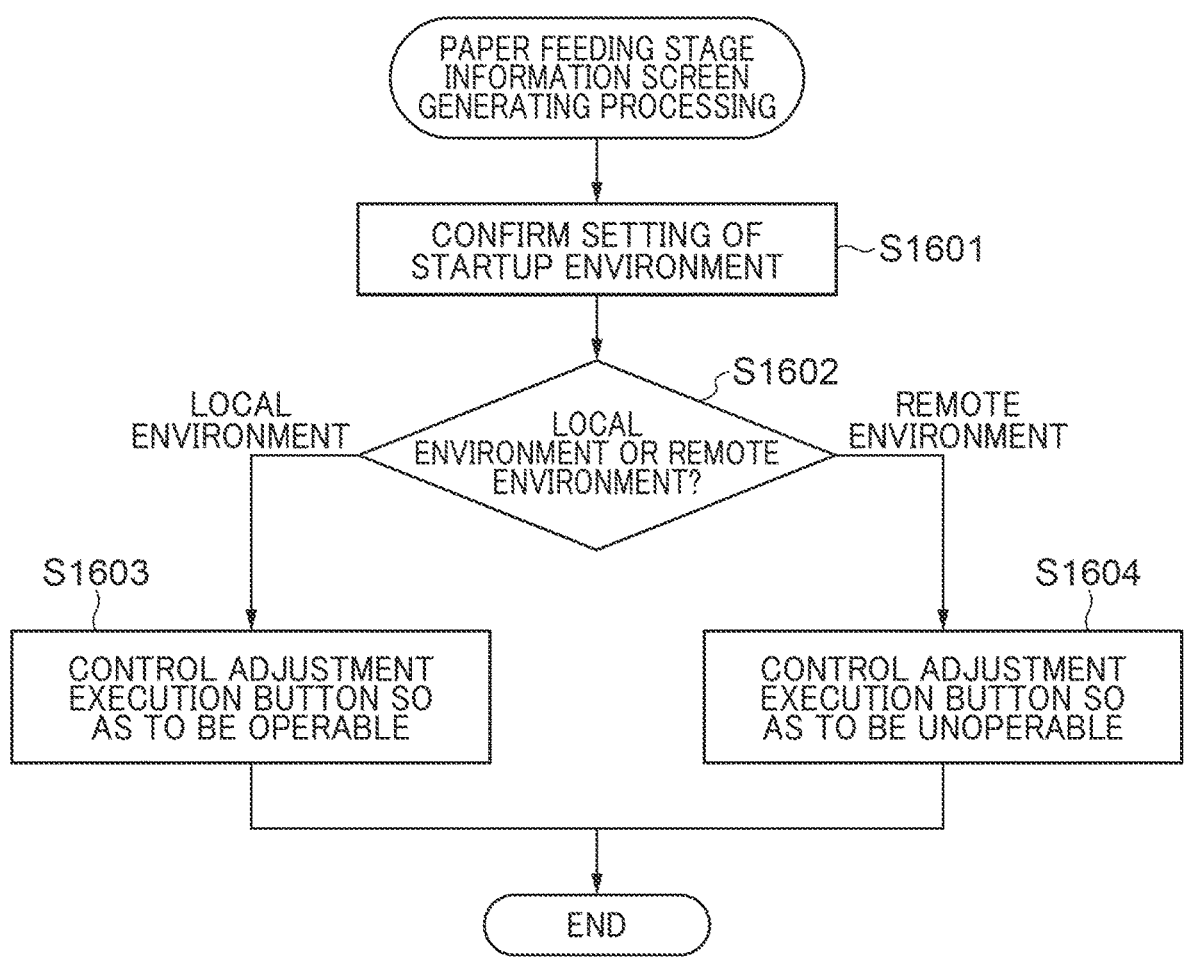

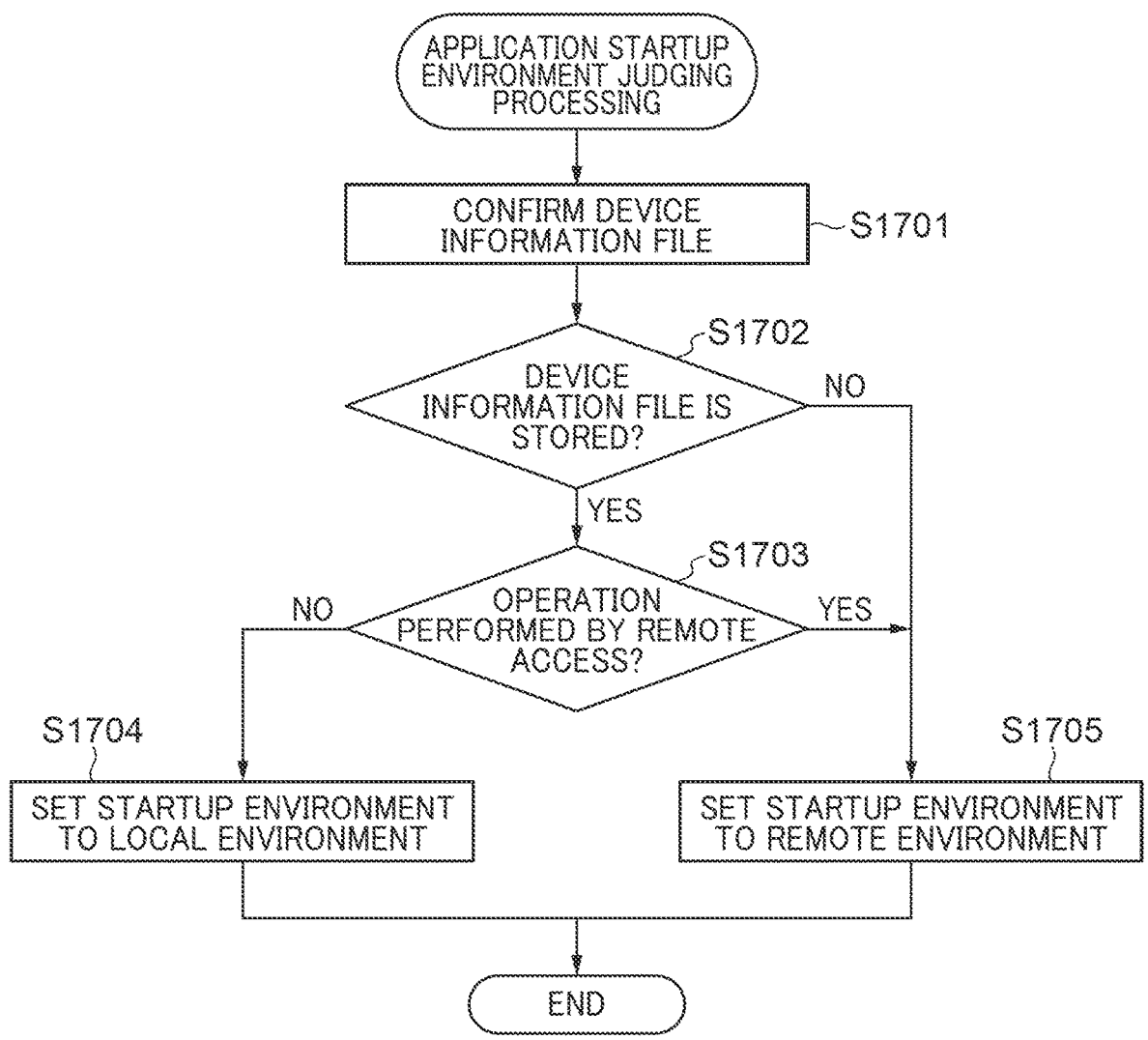

STORAGE MEDIUM STORING CONTROL PROGRAM THAT CONTROLS PRINTING APPARATUS INCLUDING AT LEAST ONE SHEET STORAGE UNIT, AND CONTROL METHOD PRELIMINARY CLASS

BACKGROUND OF THE INVENTION

Field of the Invention

The present invention relates to a storage medium storing a control program that controls a printing apparatus including at least one sheet storage unit, and a control method that controls a printing apparatus including at least one sheet storage unit.

Description of the Related Art

In the production printing market, image forming apparatuses (printing apparatuses) that are each equipped with various kinds of paper feeding stages such as a plurality of paper feeding stages, a manual feeding tray, and an inserter are used. In such an image forming apparatus, printing paper including printing sheets of different types and different sizes can be set for each paper feeding stage. An operator sets paper information that indicates the type and the size of the printing paper set for each paper feeding stage. For example, the operator starts up a paper management application provided in (installed in) an information processing apparatus connected to the image forming apparatus and sets the paper information of each paper feeding stage. In the information processing apparatus, when the paper management application starts up, a setting screen for setting the paper information of each paper feeding stage is displayed. For example, door open buttons that one is used for issuing an open instruction to open the paper feeding stage for which the paper information has been set are displayed on the setting screen (see Japanese Laid-Open Patent Publication (kokai) No. 2019-188691). As a result, the operator is able to smoothly set the printing paper by pressing down the door open button after setting the paper information, and the operability is improved. In addition, adjustment execution buttons that one is used for issuing an execution instruction to execute an adjustment processing that sets an adjustment value of such as a secondary transfer voltage optimized for the set printing paper or an image position optimized for the set printing paper and performs test printing by using the adjustment value are also displayed on the setting screen. As a result, the operator is able to issue the execution instruction to execute the adjustment processing from the information processing apparatus in addition to setting the paper information, and the operability is further improved.

However, in the case that the information processing apparatus is not located in close proximity to the image forming apparatus but is located away from the image forming apparatus, since the operator is away from the image forming apparatus, he/she does not immediately perform setting (loading) the printing paper in the paper feeding stage and/or confirming a printed matter of the test printing. In other words, in the case that the information processing apparatus is located away from the image forming apparatus, the operator will not use the door open button and/or the adjustment execution button. Rather, if the door open buttons and the adjustment execution buttons are displayed on the setting screen in such a case, there is a risk of causing an erroneous operation.

SUMMARY OF THE INVENTION

The present invention provides a user interface (UI) corresponding to a startup environment of a paper management application.

Accordingly, the present invention provides a non-transitory computer-readable storage medium storing a control program for causing a computer to execute a process that controls a printing apparatus including at least one sheet storage unit the process comprising in a case that an application for operating the printing apparatus, which is installed in a printing control apparatus capable of communicating with the printing apparatus, is running, causing a display unit to selectably display an object, which accepts an instruction for opening the sheet storage unit, via an operation unit of the printing control apparatus, and in a case that the application, which is installed in an information processing apparatus capable of communicating with the printing apparatus via the printing control apparatus, is running, restricting accepting selection of the object via an operation unit of the information processing apparatus.

According to the present invention, it is possible to provide the UI corresponding to the startup environment of the paper management application.

Further features of the present invention will become apparent from the following description of exemplary embodiments with reference to the attached drawings.

BRIEF DESCRIPTION OF THE DRAWINGS

FIG. 5A, FIG. 5B, and FIG. 5C are figures that show an example of a top screen that is displayed when a paper management application in the embodiment of the present invention works.

FIG. 5C is pressed down.

FIG. 16 is a flowchart that shows the procedure of a paper feeding stage information screen generating processing that is executed by the printing control apparatus of FIG. 1.

FIG. 17 is a flowchart that shows another procedure of the application startup environment judging processing that is executed in the step S907 of FIG. 9.

DESCRIPTION OF THE EMBODIMENTS

The present invention will now be described in detail below with reference to the accompanying drawings showing embodiments thereof.

Figure 1:
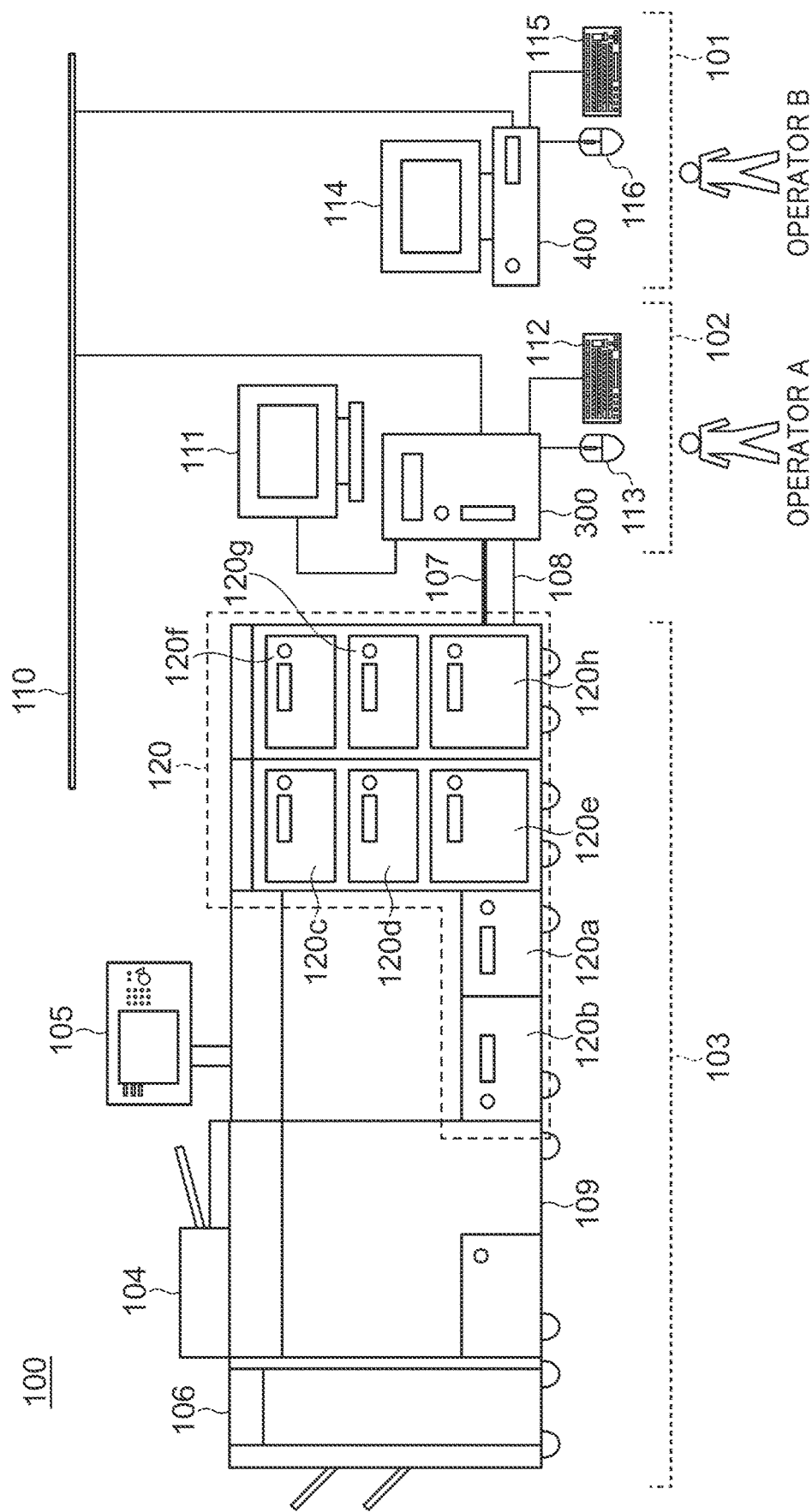
FIG. 1 is a diagram that shows an example of the overall configuration of a printing paper management system according to an embodiment of the present invention.

FIG. 1 is a diagram that shows an example of the overall configuration of a printing paper management system 100 including information processing apparatuses according to an embodiment of the present invention. As shown in FIG. 1, the printing paper management system 100 includes a client computer 101 functioning as the information processing apparatus, a printing control apparatus 102 functioning as the information processing apparatus, and an image forming apparatus 103. The printing control apparatus 102 is communicably connected to the client computer 101 via a local area network (LAN) 110 by using an Ethernet (registered trademark) cable or the like. In addition, the printing control apparatus 102 is connected to the image forming apparatus 103 via an image video cable 107 and a control cable 108. The control cable 108 is, for example, a LAN cable. In the embodiment of the present invention, the image forming apparatus 103 is not directly connected to the LAN 110. That is, the client computer 101 communicates with the image forming apparatus 103 via the printing control apparatus 102 without directly communicating with the image forming apparatus 103. Furthermore, in the embodiment of the present invention, the printing control apparatus 102 is located in close proximity to the image forming apparatus 103, and the client computer 101 is located away from the image forming apparatus 103.

The image forming apparatus 103 is a multifunction peripheral (a printing apparatus) that has a plurality of functions. The image forming apparatus 103 executes a printing processing on the basis of data received from the client computer 101 or the printing control apparatus 102. In addition, the image forming apparatus 103 is able to print a document's image data generated by reading the document on printing paper and/or is able to transmit the document's image data to a shared folder. By the operation of an operator B, the client computer 101 operates the printing paper management system 100 by starting up a paper management application 451 shown in FIG. 4B, which will be described later, and/or issues a printing instruction from a printer driver 458 shown in FIG. 4B, which will be described later.

By the operation of an operator A, the printing control apparatus 102 operates the printing paper management system 100 by starting up a paper management application 351 shown in FIG. 3B, which will be described later, and/or issues a printing instruction from a printer driver 359 shown in FIG. 3B, which will be described later. The printing control apparatus 102 has a function that performs an image processing with respect to a print job in cooperation with the image forming apparatus 103. The printing control apparatus 102 functions as an accepting means (an accepting unit) of the image forming apparatus 103 on the LAN 110, and upon receiving a communication regarding image formation, executes the image processing with respect to the communication regarding the image formation and then transfers it to the image forming apparatus 103. For example, in the case that the image forming apparatus 103 is operated by using the paper management application 451 or the printer driver 458 of the client computer 101, the printing control apparatus 102 is designated as a communication destination.

Figure 2A:
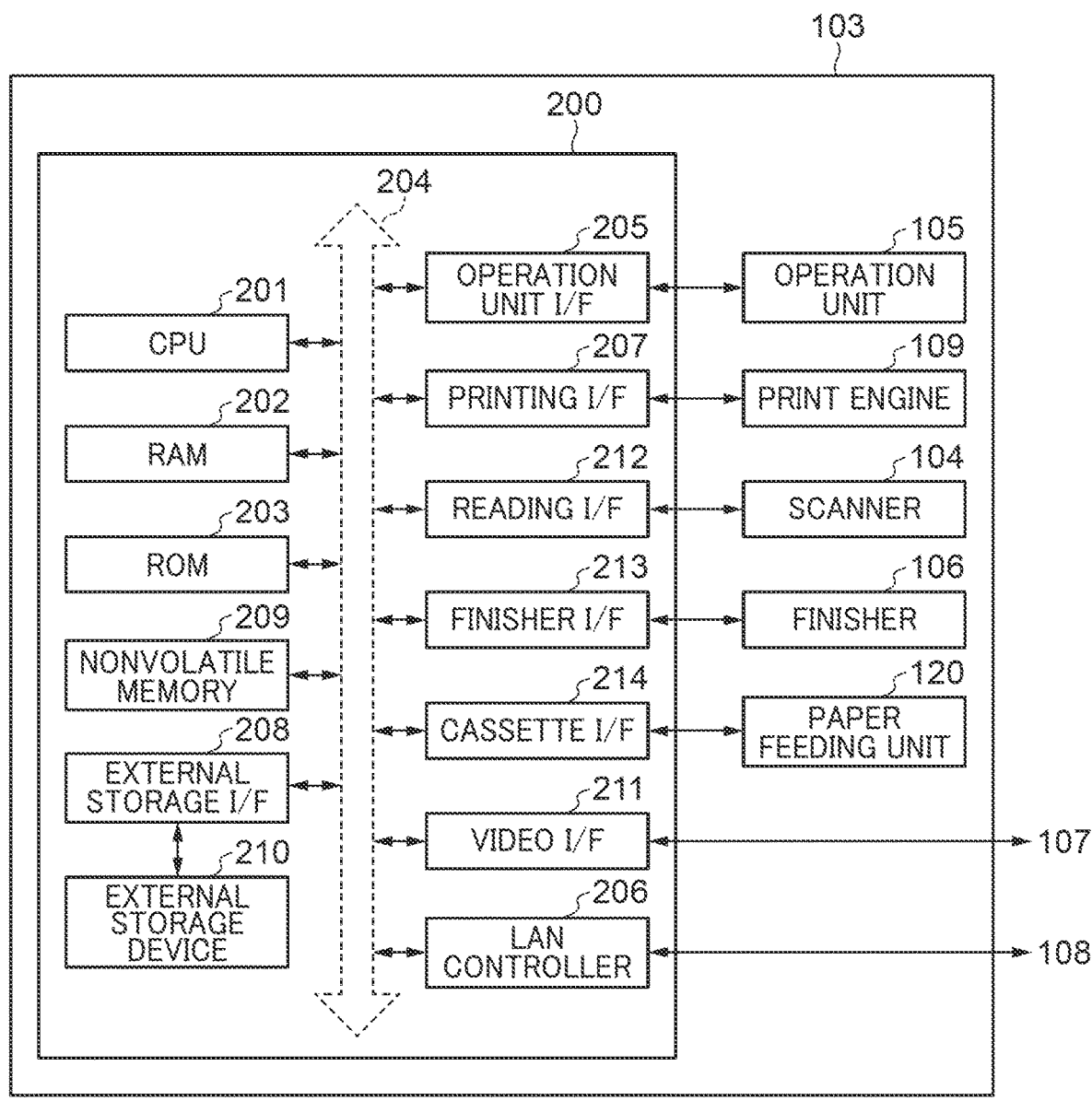
FIG. 2A and FIG. 2B are block diagrams that schematically show hardware and software configurations of an image forming apparatus of FIG. 1.
Figure 2B:
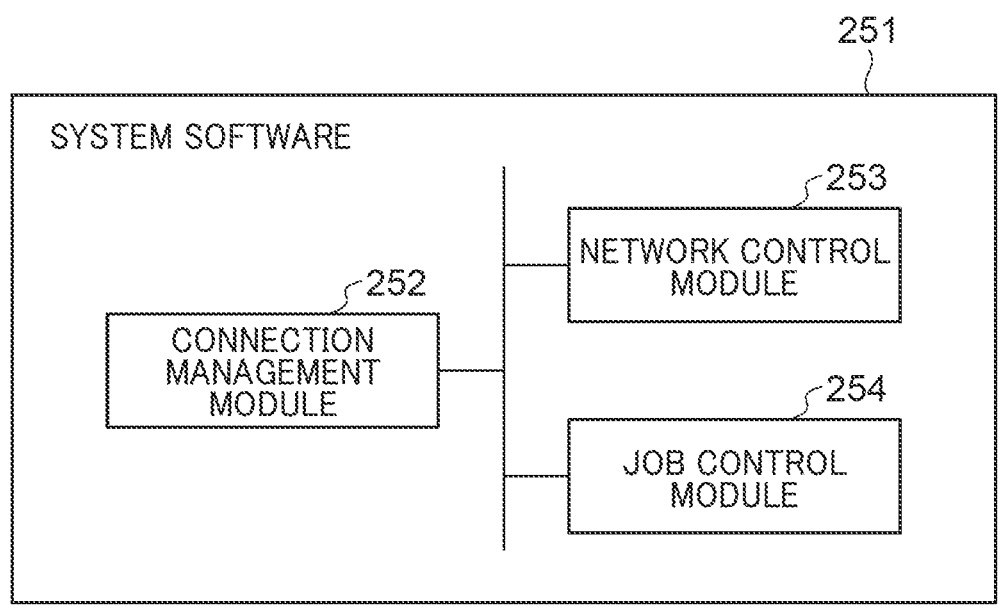

FIG. 2A and FIG. 2B are block diagrams that schematically show hardware and software configurations of the image forming apparatus 103 of FIG. 1. FIG. 2A is the block diagram that shows an example of the hardware configuration of the image forming apparatus 103. As shown in FIG. 2A, the image forming apparatus 103 includes an operation unit 105, a print engine 109, a scanner 104, a finisher 106, a paper feeding unit 120, and a controller 200.

The operation unit 105 is an operation panel that displays information to a user and accepts the operation from the user. The operation unit 105 includes a display unit such as a liquid crystal screen and an input unit such as a touch sensor or hard keys. The print engine 109 is an image forming unit that forms an image on the printing paper. The print engine 109 performs printing by forming the image by using, for example, an electrophotographic method and thermally fixing a toner image on the printing paper. The scanner 104 is a reading device that reads a document. The scanner 104 reads a document set on a pressure plate document table or a document conveyed by an auto document feeder (ADF), and generates image data of the document.

The finisher 106 is a post-processing device that performs post-processing such as sorting, punching, stapling, etc. with respect to printed matters conveyed from the print engine 109. The paper feeding unit 120 is a paper storage unit that stores the printing paper used for the image formation, and is configured by a plurality of paper feeding stages (sheet storage units) 120a to 120h. A unique number is assigned to each paper feeding stage (each sheet storage unit). Information about the printing paper stored in each paper feeding stage is managed by the paper management application 451 of the client computer 101 and the paper management application 351 of the printing control apparatus 102.

The controller 200 is a control unit that comprehensively controls the image forming apparatus 103. The controller 200 includes a central processing unit (CPU) 201, a random access memory (RAM) 202, a read only memory (ROM) 203, a nonvolatile memory 209, an external storage interface (I/F) 208, an external storage device 210, an operation unit I/F 205, and a printing I/F 207. In addition, the controller 200 includes a reading I/F 212, a finisher I/F 213, a cassette I/F 214, a video I/F 211, and a LAN controller 206.

The CPU 201 comprehensively controls accesses to various kinds of devices connected to a system bus 204 based on control programs stored in the ROM 203 or the external storage device 210. The RAM 202 functions not only as a main memory of the CPU 201 but also as a working area or the like of the CPU 201. The nonvolatile memory 209 stores various kinds of setting information. The external storage I/F 208 is connected to the external storage device 210. The external storage I/F 208 performs transfer data between the external storage device 210 and the CPU 201.

The external storage device 210 is a storage unit that stores data, and is, for example, a hard disk drive (HDD). The external storage device 210 stores application programs, font data, form data, etc. Further, the external storage device 210 is used as a job storage area for temporarily spooling print jobs and controlling the spooled print jobs from the outside. Moreover, the external storage device 210 holds the document's image data generated by the scanner 104 reading the document and/or image data of the print jobs as hold printing data. Furthermore, the external storage device 210 holds various kinds of logs such as job logs and image logs.

The operation unit I/F 205 is connected to the operation unit 105. The operation unit I/F 205 performs transfer data between the operation unit 105 and the CPU 201. The printing I/F 207 is connected to the print engine 109. The printing I/F 207 performs transfer data between the print engine 109 and the CPU 201. The reading I/F 212 is connected to the scanner 104. The reading I/F 212 performs transfer data between the scanner 104 and the CPU 201. The finisher I/F 213 is connected to the finisher 106. The finisher I/F 213 performs transfer data between the finisher 106 and the CPU 201. The cassette I/F 214 is connected to the paper feeding unit 120. The cassette I/F 214 performs transfer data between the paper feeding unit 120 and the CPU 201. The video I/F 211 receives the image data transmitted from the printing control apparatus 102 via the image video cable 107. The LAN controller 206 communicates with the printing control apparatus 102 via the control cable 108 to transmit and receive control commands and the like.

FIG. 2B is the block diagram that shows an example of the configuration of system software 251 that controls the image forming apparatus 103. As shown in FIG. 2B, the system software 251 includes a connection management module 252, a network control module 253, and a job control module 254. The system software 251 is realized by the CPU 201 of the controller 200 executing a program expanded in the RAM 202 from the external storage device 210.

The connection management module 252 controls connection management between applications running on the client computer 101 and the printing control apparatus 102, and the image forming apparatus 103. The connection management module 252 is able to manage the number of the applications currently connected and communicate with the client computer 101 and the printing control apparatus 102. The network control module 253 controls the communication processing with the printing control apparatus 102 via the LAN controller 206. The job control module 254 performs printing control such as the printing processing sequence, and the execution order of jobs. Furthermore, the job control module 254 causes the print engine 109 to execute the printing processing based on the image data received from the printing control apparatus 102.

Figure 3A:
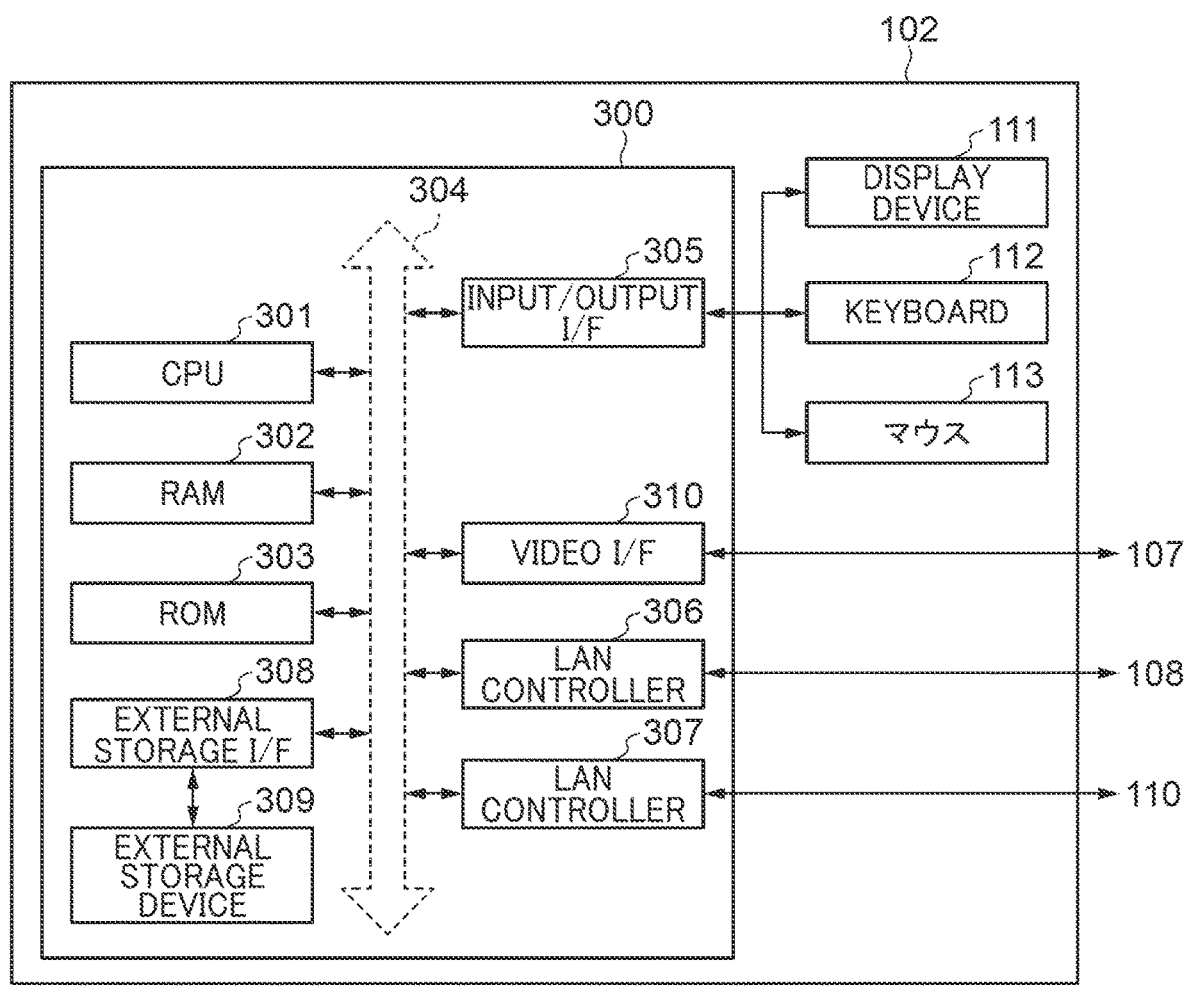
FIG. 3A and FIG. 3B are block diagrams that schematically show hardware and software configurations of a printing control apparatus of FIG. 1.
Figure 3B:
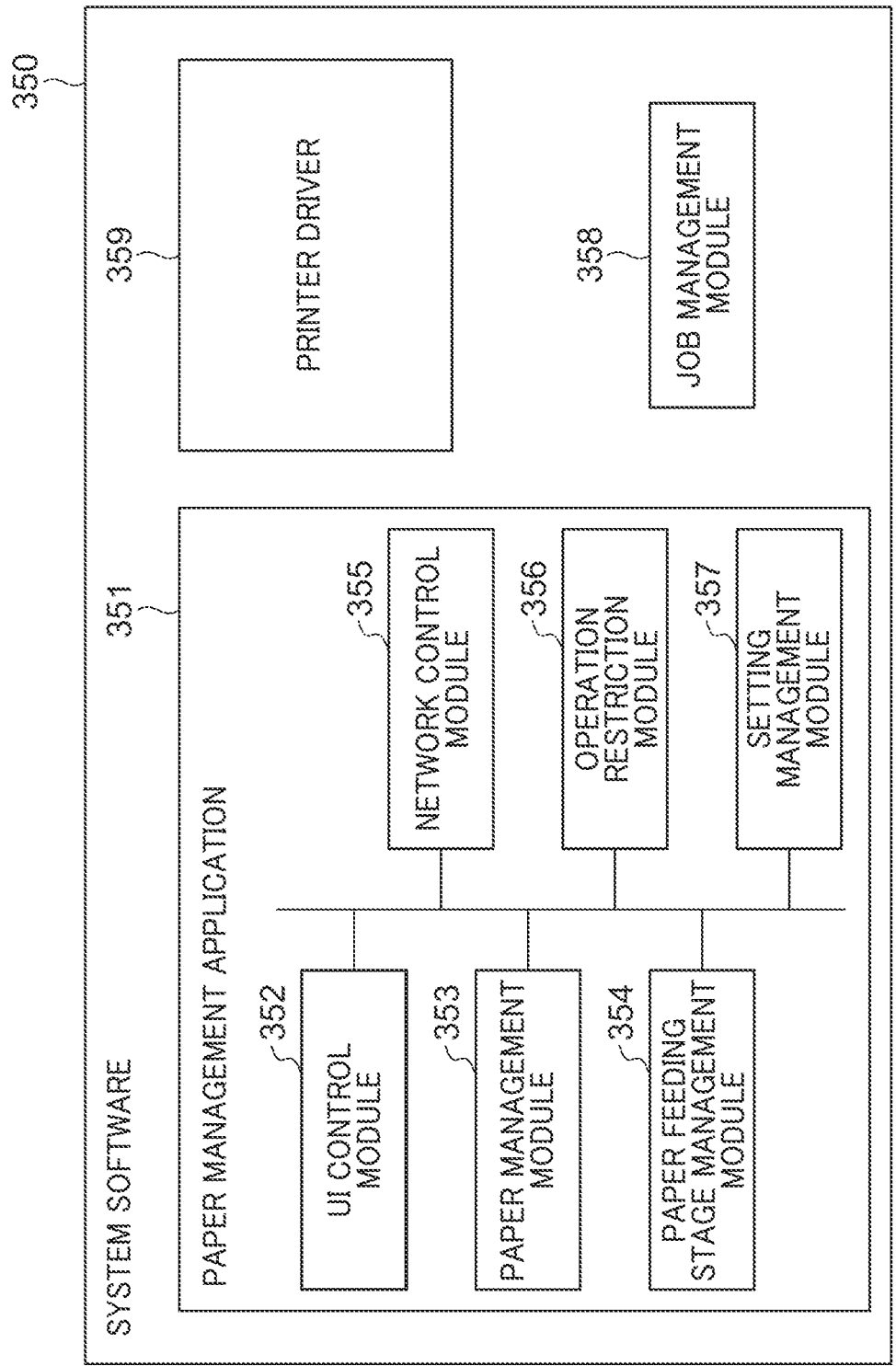

FIG. 3A and FIG. 3B are block diagrams that schematically show hardware and software configurations of the printing control apparatus 102 of FIG. 1. FIG. 3A is the block diagram that shows an example of the hardware configuration of the printing control apparatus 102. As shown in FIG. 3A, the printing control apparatus 102 includes a display device 111, a keyboard 112, a mouse 113, and a controller 300.

The display device 111 is a display unit that displays information, and is, for example, a liquid crystal monitor. It should be noted that the display device 111 may be a touch panel. The keyboard 112 and the mouse 113 constitute an input unit that accepts input operations performed by the user.

The controller 300 is a control unit that comprehensively controls the printing control apparatus 102. The controller 300 includes a CPU 301, a RAM 302, a ROM 303, an input/output I/F 305, an external storage I/F 308, an external storage device 309, a LAN controller 306, a LAN controller 307, and a video I/F 310.

The CPU 301 comprehensively controls accesses to various kinds of devices connected to a system bus 304 based on control programs stored in the ROM 303 or the external storage device 309. The RAM 302 functions not only as a main memory of the CPU 301 but also as a working area or the like of the CPU 301. The input/output I/F 305 is connected to the display device 111, the keyboard 112, and the mouse 113, respectively. The input/output I/F 305 performs transfer data between the connected display device 111 and the CPU 301. The input/output I/F 305 performs transfer data between the connected keyboard 112 and the CPU 301. The input/output I/F 305 performs transfer data between the connected mouse 113 and the CPU 301.

The external storage I/F 308 is connected to the external storage device 309. The external storage I/F 308 performs transfer data between the external storage device 309 and the CPU 301. The external storage device 309 is a storage unit that stores data, and is, for example, an HDD. The external storage device 309 stores application programs, font data, form data, etc. Further, the external storage device 309 is used as a storage area for temporarily spooling print jobs, and is also used as a storage area for storing the print jobs obtained by performing a RIP (Raster Image Processor) processing with respect to the spooled print jobs.

The LAN controller 306 communicates with the image forming apparatus 103 via the control cable 108 to transmit and receive control commands and the like. The LAN controller 307 is connected to an external network via a cable 110. The video I/F 310 transmits the RIP-processed image data to the image forming apparatus 103 via the image video cable 107.

FIG. 3B is the block diagram that shows an example of the configuration of system software 350 that controls the printing control apparatus 102. As shown in FIG. 3B, the system software 350 includes the paper management application 351, the printer driver 359, and a job management module 358.

The paper management application 351 is application software for the operator to confirm the attributes of the printing paper set in each of the paper feeding stages 120a to 120h of the image forming apparatus 103, and for the operator to set attribute information of the printing paper with respect to each paper feeding stage. The paper management application 351 includes a UI control module 352, a paper management module 353, a paper feeding stage management module 354, a network control module 355, an operation restriction module 356, and a setting management module 357. The UI control module 352 performs control that displays a screen on the display device 111. In addition, according to system settings of the printing paper management system 100, the UI control module 352 performs, for example, control that switches the display language of a top screen 500 of FIG. 5A to be described later, and control that switches the display of the unit system of the printing paper size such as "millimeter" and "inch" on the top screen 500.

The paper management module 353 manages paper information that is obtained from the image forming apparatus 103. The paper information is information such as the sizes and the types of the printing paper set in the paper feeding stages 120*a* to 120*h*, and is managed by a paper management table. The paper management table is stored in the external storage device 309, which is a nonvolatile area. The paper feeding stage management module 354 manages paper feeding stage information that is obtained from the image forming apparatus 103. The paper feeding stage information is information relating to the paper feeding stages 120*a* to 120*h*, and is managed by a paper feeding stage management table. The paper feeding stage management table is also stored in the external storage device 309, which is the nonvolatile area.

The network control module 355 controls, for example, the communication processing with the image forming apparatus 103 via the LAN controller 306, and the communication processing with the client computer 101 on the network via the LAN controller 307. The operation restriction module 356 controls multiple connections. A table for managing operation restrictions is stored in the external storage device 309, which is the nonvolatile area. The setting management module 357 manages the system settings of the printing paper management system 100 and favorite information. For example, the setting management module 357 is able to edit, add, delete, and search the favorite information. The system settings of the printing paper management system 100 are, for example, the setting of the display language of the top screen 500 described later and the setting of the unit system of the printing paper size on the top screen 500. A setting management table is a management table for managing the system settings of the printing paper management system 100. The setting management table is stored in the external storage device 309, which is the nonvolatile area.

The job management module 358 manages the printing processing sequence, and the execution order of jobs. In addition, the job management module 358 performs control that manages a job received by the printing control apparatus 102 and transfers data for executing the job to the image forming apparatus 103 via the LAN controller 306 and the video I/F 310. Furthermore, the job management module 358 transfers data, which is transmitted from the network to a specific port of the LAN controller 306, to a designated destination on the network.

Figure 4A:
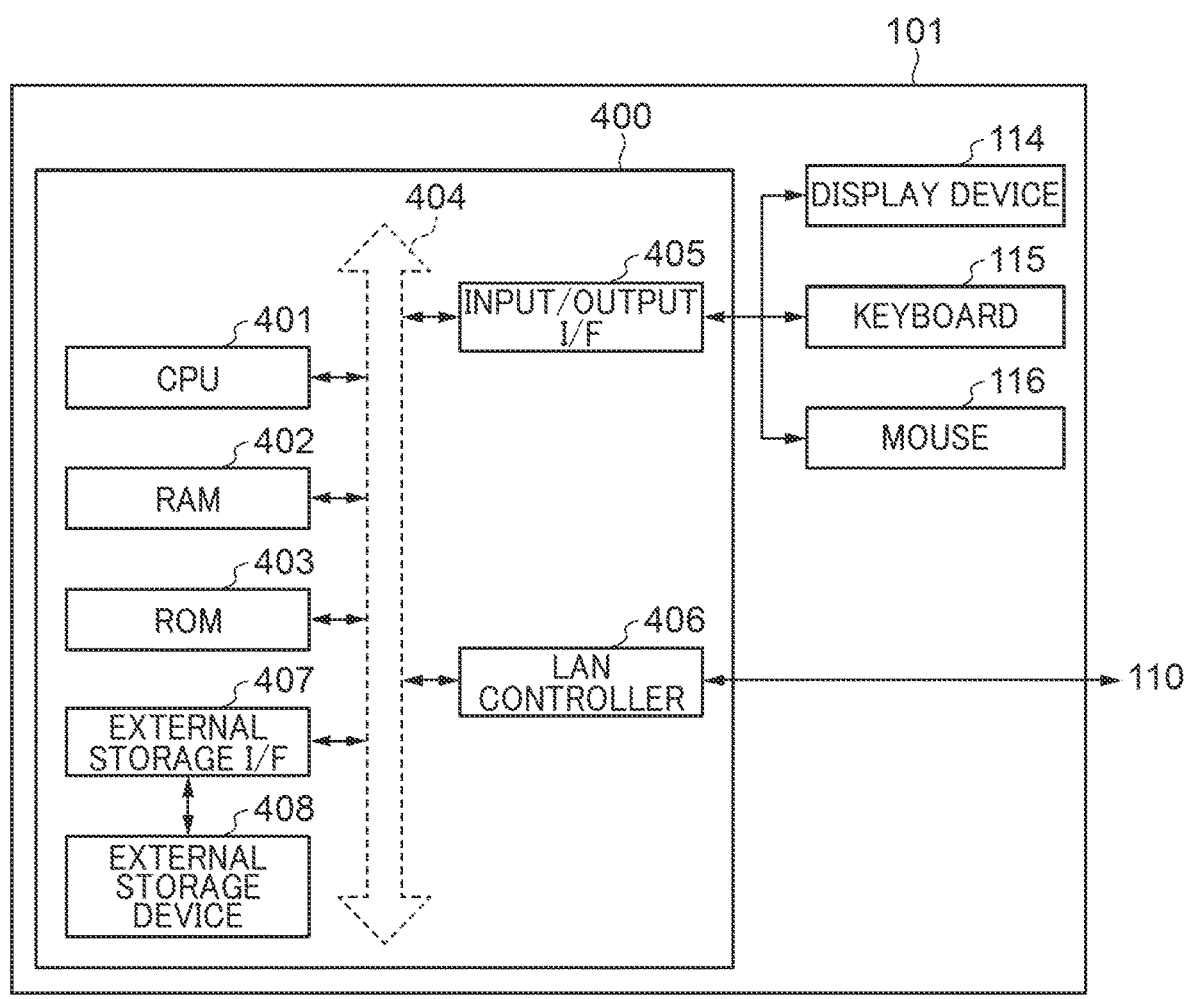
FIG. 4A and FIG. 4B are block diagrams that schematically show hardware and software configurations of a client computer of FIG. 1.
Figure 4B:
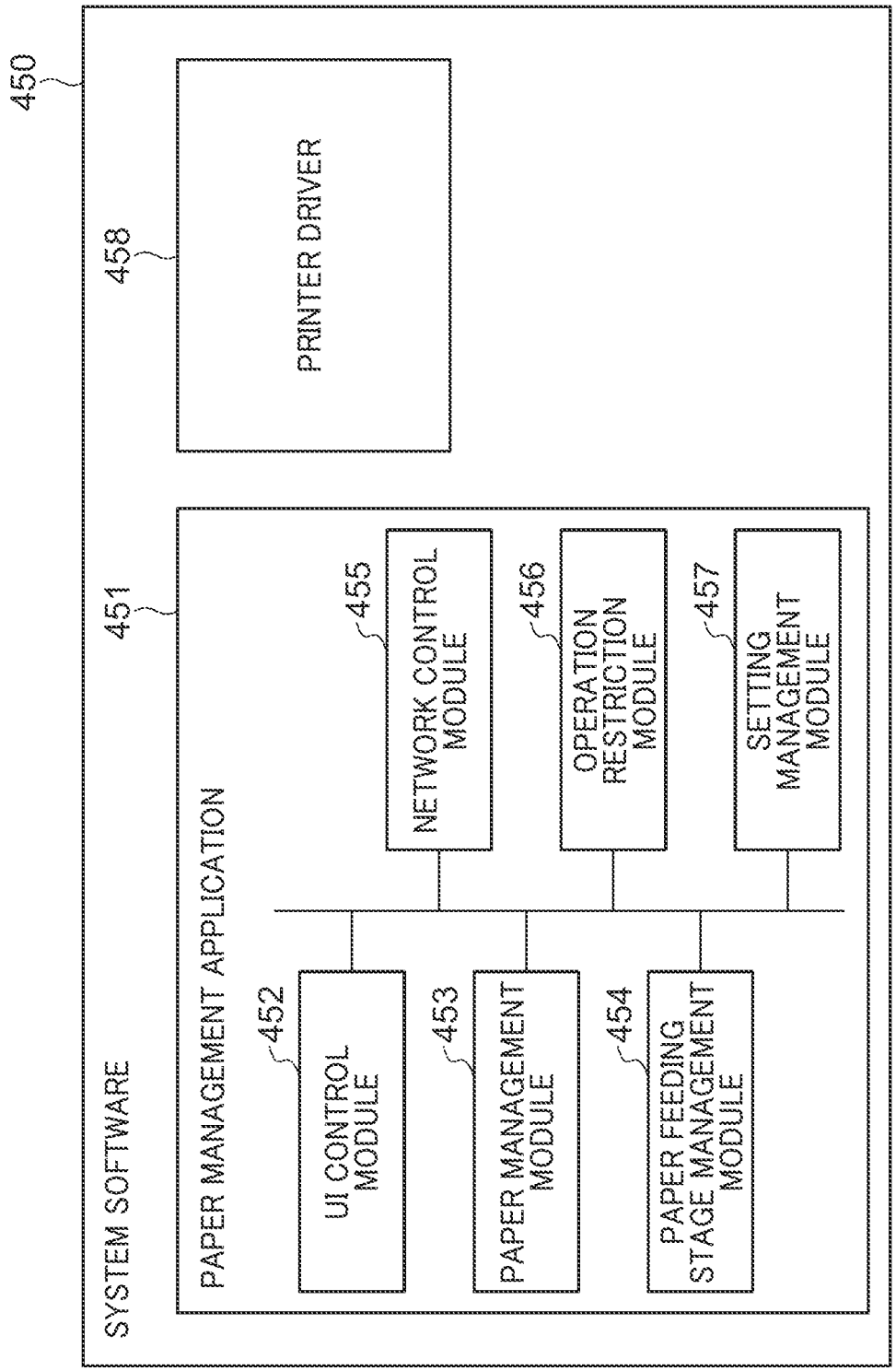

FIG. 4A and FIG. 4B are block diagrams that schematically show hardware and software configurations of the client computer 101 of FIG. 1. FIG. 4A is the block diagram that shows an example of the hardware configuration of the client computer 101. As shown in FIG. 4A, the client computer 101 includes a display device 114, a keyboard 115, a mouse 116, and a controller 400.

The display device 114 is a display unit that displays information, and is, for example, a liquid crystal monitor. It should be noted that the display device 114 may be a touch panel. The keyboard 115 and the mouse 116 constitute an input unit that accepts input operations performed by the user.

The controller 400 is a control unit that comprehensively controls the client computer 101. The controller 400 includes a CPU 401, a RAM 402, a ROM 403, an input/output I/F 405, an external storage I/F 407, an external storage device 408, and a LAN controller 406.

The CPU 401 comprehensively controls accesses to various kinds of devices connected to a system bus 404 based on control programs stored in the ROM 403 or the external storage device 408. The RAM 402 functions not only as a main memory of the CPU 401 but also as a working area or the like of the CPU 401. The external storage I/F 407 is connected to the external storage device 408. The external storage I/F 407 performs transfer data between the external storage device 408 and the CPU 401. The external storage device 408 is a storage unit that stores data, and is, for example, an HDD. The external storage device 408 stores application programs, font data, form data, etc.

The input/output I/F 405 is connected to the display device 114, the keyboard 115, and the mouse 116, respectively. The input/output I/F 405 performs transfer data between the connected display device 114 and the CPU 401. The input/output I/F 405 performs transfer data between the connected keyboard 115 and the CPU 401. The input/output I/F 405 performs transfer data between the connected mouse 116 and the CPU 401. It should be noted that although the configuration in which a plurality of devices is connected to the one input/output I/F 405 will be described in the embodiment of the present invention, the configuration is not limited to this. For example, the controller 400 may include as many input/output I/Fs as there are the connected devices, and the display device 114, the keyboard 115, and the mouse 116 may be connected to separate input/output I/Fs. The LAN controller 406 is connected to the external network via the cable 110.

FIG. 4B is the block diagram that shows an example of the configuration of system software 450 that controls the client computer 101. The system software 450 includes the paper management application 451 having the same functions and configuration as the paper management application 351 described above, and the printer driver 458 having the same functions as the printer driver 359 described above. It should be noted that as shown in FIG. 4B, the paper management application 451 includes a UI control module 452, a paper management module 453, a paper feeding stage management module 454, a network control module 455, an operation restriction module 456, and a setting management module 457.

Figure 5A:
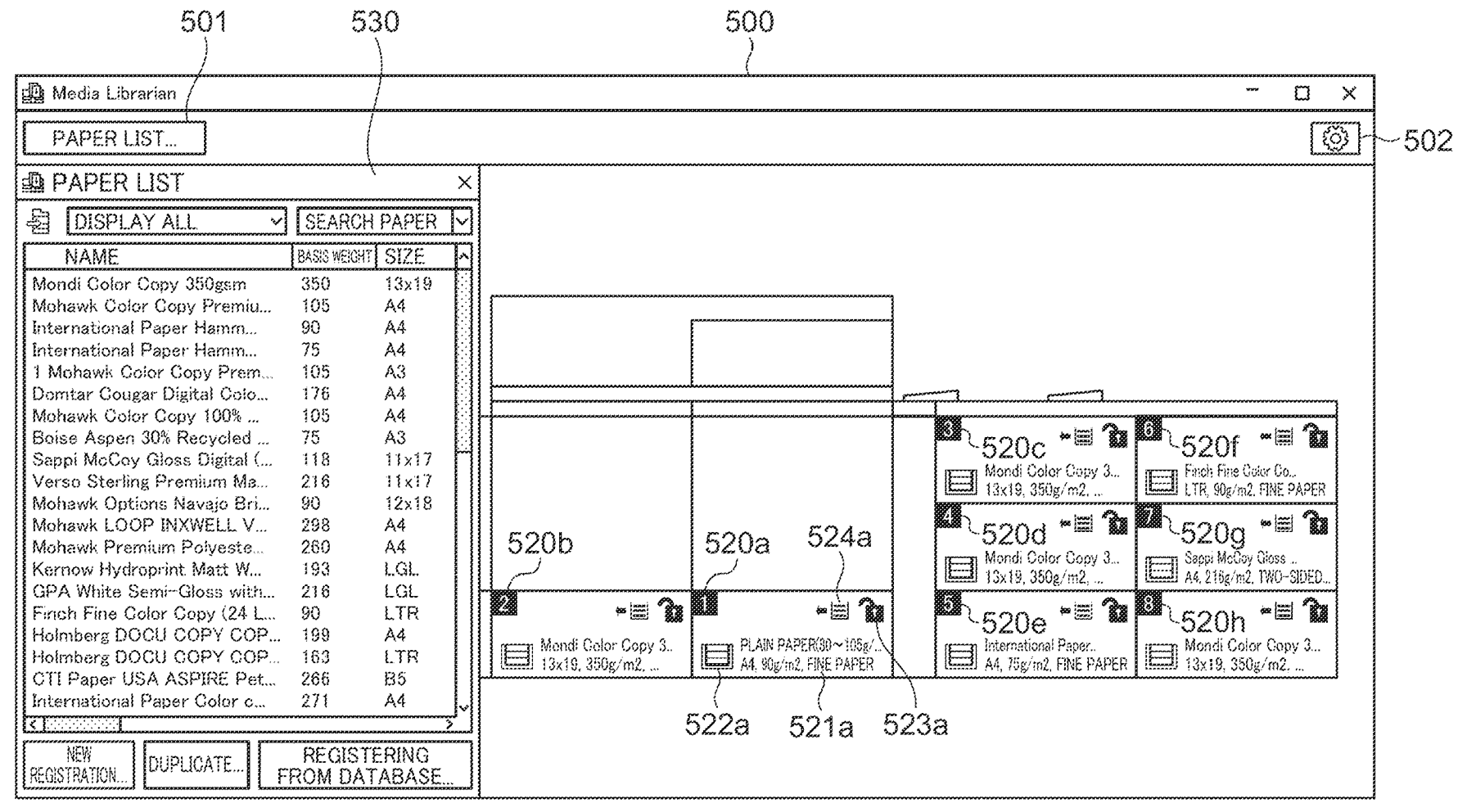
Figure 5C:
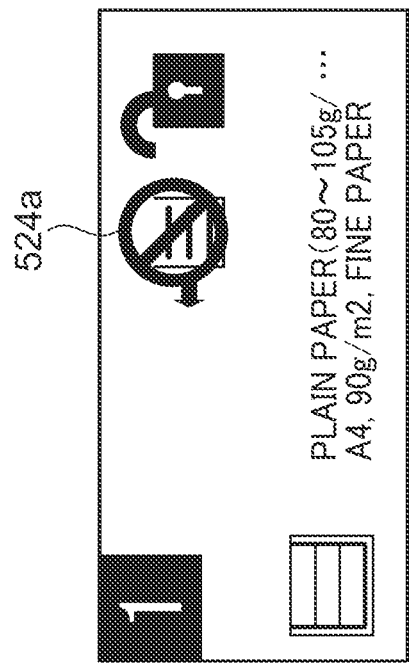
Figure 5B:
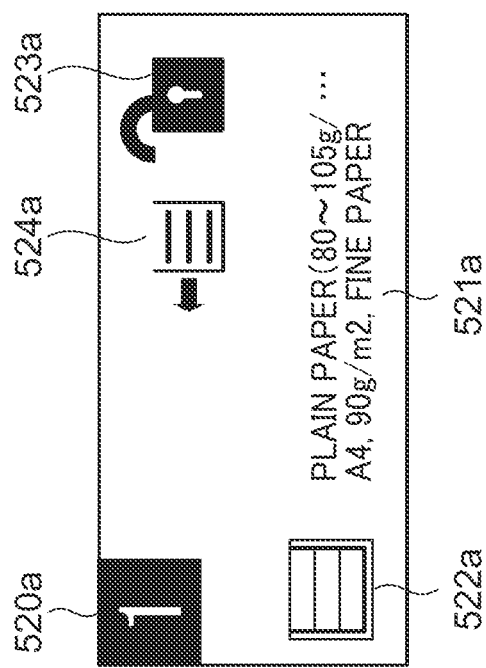

FIG. 5A, FIG. 5B, and FIG. 5C are figures that show an example of the top screen 500 that is displayed when the paper management application in the embodiment of the present invention works. In the printing paper management system 100, when the paper management application 451 starts up on the client computer 101, the top screen 500 is displayed on the display device 114 of the client computer 101. On the other hand, when the paper management application 351 starts up on the printing control apparatus 102, the top screen 500 is displayed on the display device 111 of the printing control apparatus 102. Here, as an example, the case that the paper management application 351 starts up on the printing control apparatus 102 will be described.

When the paper management application 351 starts up, the printing control apparatus 102 obtains device configuration information including model information and hardware option information, which will be described later, from the image forming apparatus 103, and generates components that constitute the top screen 500 on the basis of the obtained device configuration information. For example, the printing control apparatus 102 generates a plurality of paper feeding stage buttons corresponding to each paper feeding stage of the paper feeding unit 120 of the image forming apparatus 103. In the printing control apparatus 102, image data drawn into a video memory according to the instruction transmitted from the CPU 301 is outputted as video signals to the display device 111, and the top screen 500 of FIG. 5A is displayed on the display device 111 based on the video signals. The top screen 500 includes a paper list button 501, a setting button 502, and paper feeding stage buttons 520*a* to 520*h*.

The paper list button 501 is a button for issuing an instruction to display a paper list screen 530. When the paper list button 501 is pressed down, the controller 300 displays the paper list screen 530 in the foreground based on paper management information stored in the external storage device 309. The operator is able to operate the paper list screen 530 to issue an instruction for changing the paper information such as new registration or duplication of the printing paper.

The setting button 502 is a button for issuing an instruction to display a screen that changes settings related to the paper management application 351. When the setting button 502 is pressed down, the controller 300 obtains setting information related to the paper management application 351 from the external storage device 309 and causes the display device 111 to display the obtained setting information related to the paper management application 351.

The paper feeding stage buttons 520a to 520h are operation buttons respectively corresponding to the paper feeding stages 120a to 120h that constitute the paper feeding unit 120 of the image forming apparatus 103. It should be noted that in the embodiment of the present invention, the paper feeding stage buttons 520a to 520h have the same configuration. Here, as an example, the configuration will be described by using the paper feeding stage button 520a.

As shown in FIG. 5B, the paper feeding stage button 520a includes paper information 521a, a paper remaining amount 522a, lock information 523a, and a door open button 524a (an object). The paper information set for the paper feeding stage 120a is displayed on the paper information 521a. The remaining amount of the printing paper stored in the paper feeding stage 120a is displayed on the paper remaining amount 522a. Information, which indicates whether or not to control the paper information of the paper feeding stage 120a so that it cannot be operated temporarily, is displayed on the lock information 523a. The door open button 524a is a button for issuing an instruction (an operating instruction) to open the paper feeding stage 120a from the paper management application 351 to the image forming apparatus 103. For example, in the case that the paper management application 351 is permitted to issue the instruction to open the paper feeding stage 120a to the image forming apparatus 103, as shown in FIG. 5B, the door open button 524a is displayed in a state in which the operator can select it. On the other hand, in the case that the paper management application 351 is not permitted to issue the instruction to open the paper feeding stage 120a to the image forming apparatus 103, as shown in FIG. 5C, the door open button 524a is displayed in a state in which the operator cannot select it. Moreover, in the embodiment of the present invention, in the case that transmission of the instruction to open the paper feeding stage 120a from the paper management application 351 to the image forming apparatus 103 is not permitted, although a configuration that the door open button 524a is displayed in the state in which the operator cannot select it will be described, the present invention is not limited to this configuration. For example, in such a case, the control may be performed so that the door open button 524a is not displayed.

When the controller 300 receives a paper feeding stage state change event, which indicates that the state of the paper feeding stage has changed, from the image forming apparatus 103, the controller 300 obtains new paper feeding stage information from the image forming apparatus 103. The controller 300 redraws the paper feeding stage buttons 520a to 520h based on the obtained new paper feeding stage information.

Next, the opening/closing control mechanism of the paper feeding unit 120 will be described.

Figure 6A:
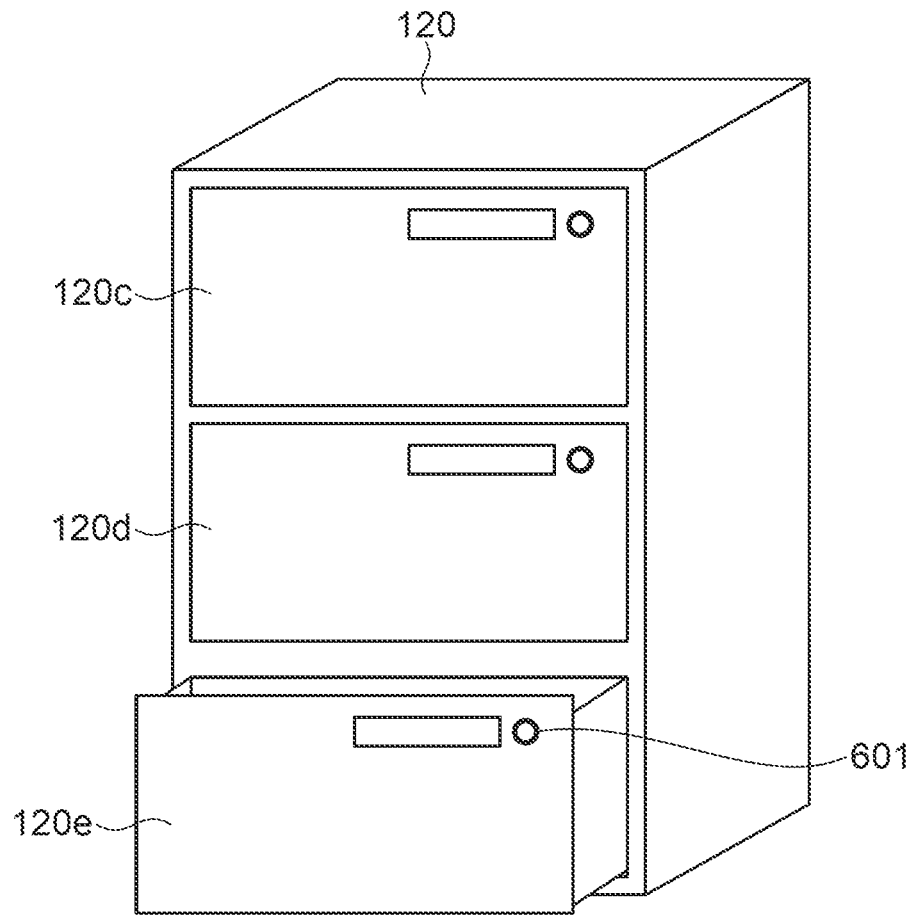
FIG. 6A and FIG. 6B are views for explaining a configuration of a paper feeding unit of FIG. 1.
Figure 6B:
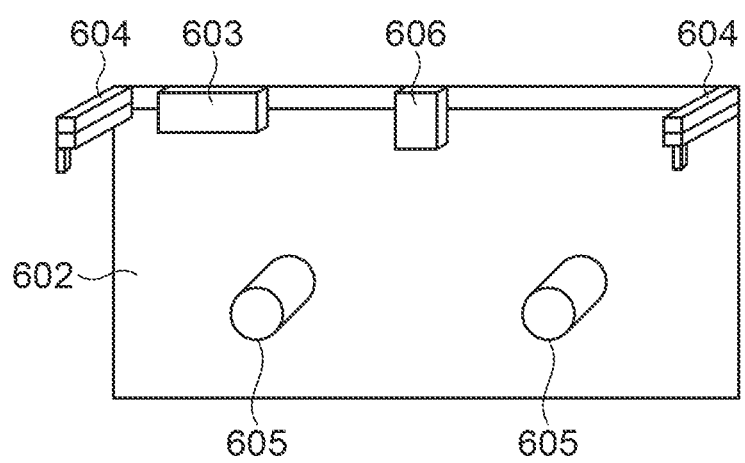

FIG. 6A and FIG. 6B are views for explaining a configuration of the paper feeding unit 120 of FIG. 1. It should be noted that in the embodiment of the present invention, the paper feeding stages 120a to 120h that constitute the paper feeding unit 120 have the same configuration. Here, as an example, the configuration will be described by using the paper feeding stage 120e. FIG. 6A is an external view that shows a part of the paper feeding unit 120 of FIG. 1. Further, FIG. 6B is a view that shows a front cover portion of the paper feeding stage 120e when viewed from the back.

As shown in FIG. 6A, the paper feeding stage 120e includes an open button 601 for instructing the opening/closing operation. For example, when the operator presses down the open button 601, a solenoid 603 that controls the opening/closing of the paper feeding stage 120e is activated. Then, paper feeding stage lock portions 604 are unlocked, and the paper feeding stage 120e becomes in an open state. When the paper feeding stage 120e becomes in the open state, the force of springs 605 pushes the entire face of the paper feeding stage 120e forward by several centimeters, and this allows the operator to physically pull out the paper feeding stage 120e. Further, when a paper feeding stage lock detection sensor 606 detects the open state of the paper feeding stage 120e, the RAM 202 is notified of the open state of the paper feeding stage 120e via the print engine 109.

On the other hand, the paper feeding stage 120e is closed when the operator physically pushes a front cover portion 602 of the paper feeding stage 120e. When the paper feeding stage lock detection sensor 606 detects the closed state of the paper feeding stage 120e, the RAM 202 is notified of the closed state of the paper feeding stage 120e via the print engine 109. Further, the transmission destination, which is registered as the transmission destination for notifying a change in the state of each paper feeding stage in the paper feeding unit 120, is notified that the paper feeding stage 120e is closed.

In the embodiment of the present invention, in addition to pressing down the open button, the instruction to open any one of the paper feeding stages 120a to 120h can be realized by pressing down the door open button 524a or the like displayed on the above-described top screen 500. For example, when the controller 300 of the printing control apparatus 102 with the top screen 500 displayed on the display device 111 detects that the door open button 524a has been pressed down, the controller 300 transmits the instruction to open the paper feeding stage 120a corresponding to the door open button 524a to the image forming apparatus 103. According to the received open instruction, the image forming apparatus 103 makes the paper feeding stage 120a become in the open state.

Next, folder structures of the printing control apparatus 102 and the client computer 101 will be described.

Figure 7A:
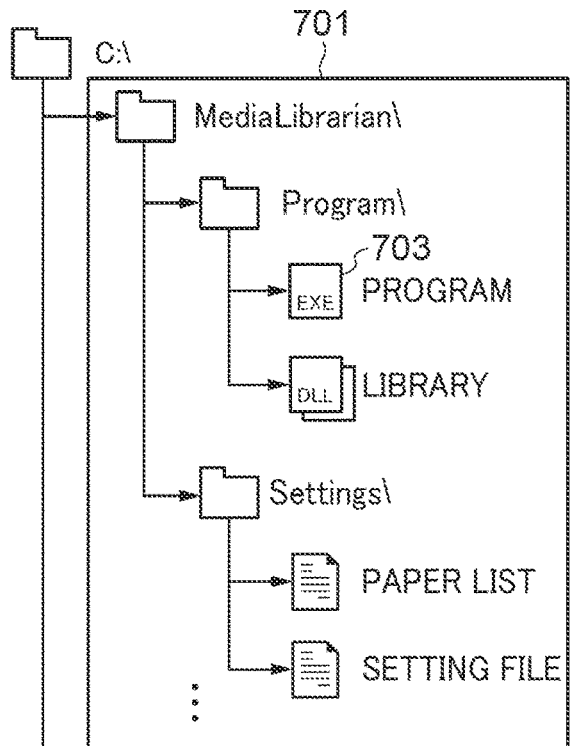
FIG. 7A is a figure for explaining a folder structure of the printing control apparatus of FIG. 1.
Figure 7A:
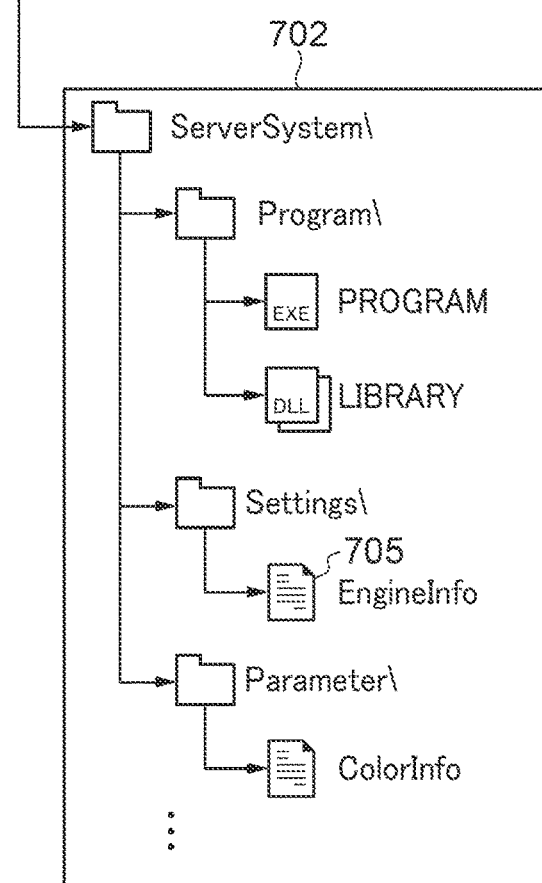
Figure 7B:
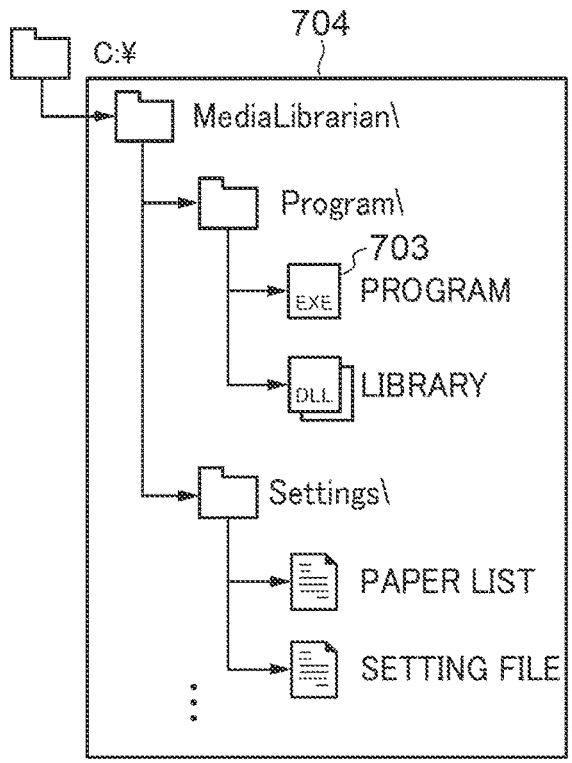
FIG. 7B is a figure for explaining a folder structure of the client computer of FIG. 1.

FIG. 7A is a figure for explaining the folder structure of the printing control apparatus 102 of FIG. 1, and FIG. 7B is a figure for explaining the folder structure of the client computer 101 of FIG. 1. FIG. 7A is the figure that shows an example of folders in the printing control apparatus 102. Further, FIG. 7B is the figure that shows an example of folders in the client computer 101.

As shown in FIG. 7A, the printing control apparatus 102 includes a paper management application folder 701 and a server system folder 702. On the other hand, as shown in FIG. 7B, the client computer 101 includes a paper management application folder 704 and does not include a folder corresponding to the server system folder 702. It should be noted that the paper management application folder 701 and the paper management application folder 704 have the same configuration. Here, as an example, the configuration will be described by using the paper management application folder 701.

The paper management application folder 701 is a directory area in which execution files 703 and various kinds of setting files that are related to the paper management application 351 of the printing control apparatus 102 are stored. The server system folder 702 is used when using a port forwarding function. The port forwarding function (a function to forward received data) is a function that forwards packets arriving at a specific port to another device. For example, when the paper management application 451 of the client computer 101 designates an IP address of the printing control apparatus 102 and accesses it, a packet arrives at a predetermined port of the LAN controller 307 of the printing control apparatus 102. The predetermined port is, for example, a port for the paper management application. The printing control apparatus 102 that has received the packet forwards this packet to another device, specifically, to the image forming apparatus 103 directly connected to the printing control apparatus 102. It should be noted that information, which indicates the device to which the packet is forwarded (the image forming apparatus 103), is recorded in a device information file 705 stored in the server system folder 702. Further, when a reply packet from the image forming apparatus 103 arrives at the LAN controller 306, the printing control apparatus 102 forwards this reply packet to the client computer 101. In this manner, the client computer 101 is able to transmit and receive data to and from the image forming apparatus 103 via the printing control apparatus 102. As a result, the client computer 101 running the paper management application 451 is able to obtain device information of the image forming apparatus 103 in the same way as the printing control apparatus 102 running the paper management application 351.

Moreover, when the client computer 101 not directly connected to the image forming apparatus runs the paper management application 451, it is necessary to designate that which image forming apparatus is connected to the client computer 101.

Figure 8:
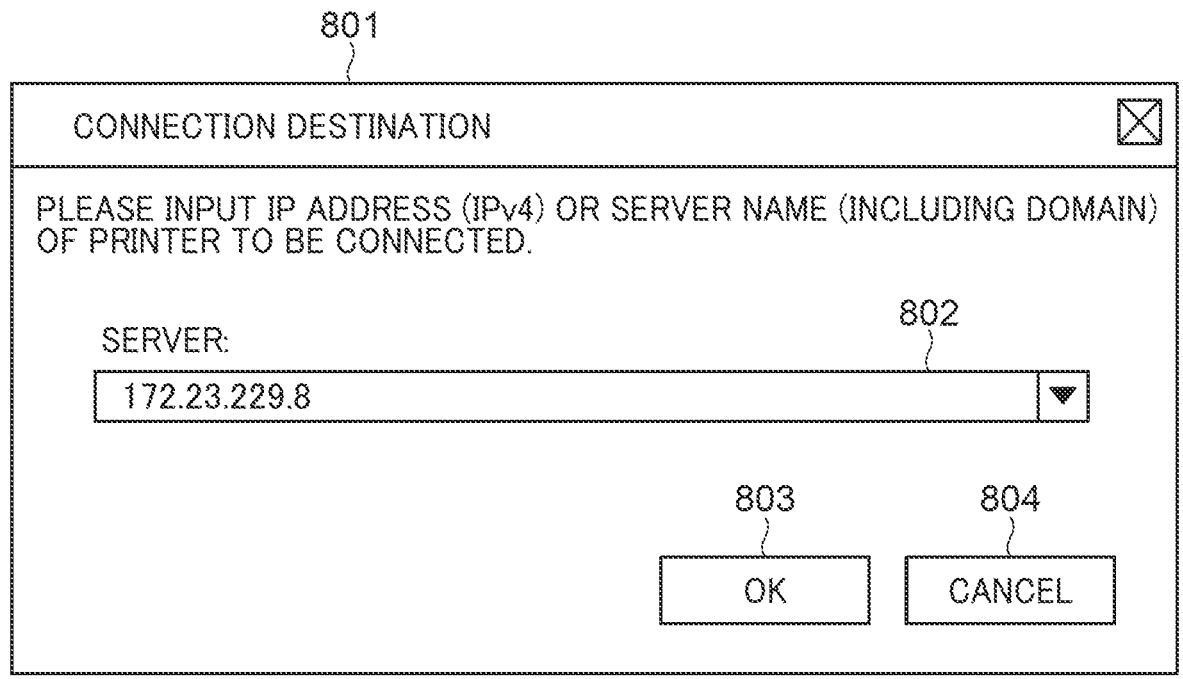
FIG. 8 is a figure that shows an example of a connection destination designating screen that is displayed on a display device of the client computer of FIG. 1.

FIG. 8 is a figure that shows an example of a connection destination designating screen 801 that is displayed on the display device 114 of the client computer 101 of FIG. 1. The connection destination designating screen 801 is a screen for designating the printing control apparatus, which becomes a connection destination of the paper management application 451 of the client computer 101. In the client computer 101, image data drawn into a video memory according to the instruction transmitted from the CPU 401 is outputted as video signals to the display device 114, and the connection destination designating screen 801 is displayed on the display device 114 based on the video signals.

The connection destination designating screen 801 includes an address input field 802, an OK button 803, and a cancel button 804. The address input field 802 is an input field for the IP address or server name of the printing control apparatus being the connection destination. The OK button 803 is a button for communicating with the image forming apparatus 103 via the printing control apparatus 102 by using the IP address inputted into the address input field 802. The cancel button 804 is a button for ending the paper management application 451 without communicating with the image forming apparatus 103 via the printing control apparatus 102.

Next, a startup processing of the paper management application in the embodiment of the present invention will be described. In the following description, as an example, although the startup processing of the paper management application 351 of the printing control apparatus 102 will be described, the startup processing of the paper management application 451 of the client computer 101 has the same processing contents. Furthermore, the startup processing of the paper management application 451 is realized by the CPU 401 of the controller 400 executing a program expanded in the RAM 402 from the external storage device 408.

Figure 9:
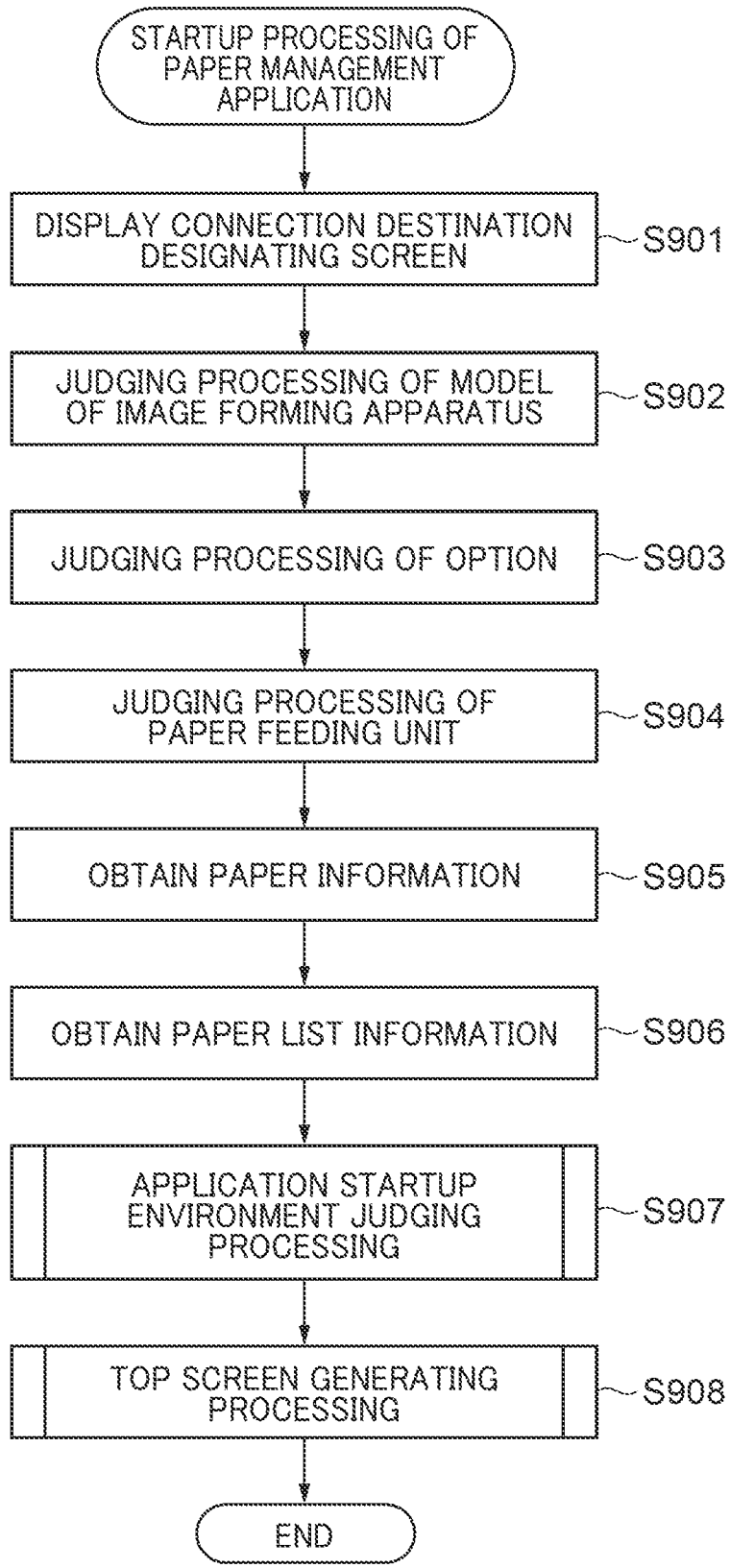
FIG. 9 is a flowchart that shows the procedure of a startup processing of the paper management application in the embodiment of the present invention.

FIG. 9 is a flowchart that shows the procedure of the startup processing of the paper management application in the embodiment of the present invention. The startup processing of the paper management application 351 is realized by the CPU 301 of the controller 300 executing a program expanded in the RAM 302 from the external storage device 309. For example, the startup processing of the paper management application 351 is executed when an icon (not shown) of the paper management application 351 displayed on the display device 111 of the printing control apparatus 102 is selected by the operator.

As shown in FIG. 9, in a step S901, the controller 300 causes the display device 111 to display the connection destination designating screen 801. The IP address or host name of the connection destination device is inputted into the address input field 802 of the connection destination designating screen 801. In the startup processing of the paper management application 351, the IP address of the printing control apparatus 102 is inputted into the address input field 802 so that it is possible to execute paper management of the image forming apparatus 103 from the printing control apparatus 102. It should be noted that in the startup processing of the paper management application 451 of the client computer 101, the IP address of the printing control apparatus 102 is inputted into the connection destination designating screen 801 so that it is possible to execute the paper management of the image forming apparatus 103 from the client computer 101. When the IP address of the printing control apparatus 102 is inputted into the address input field 802 and the OK button 803 is pressed down, the controller 300 connects to its own device designated by the inputted IP address. Then, the controller 300 notifies the image forming apparatus 103 of the IP address of the printing control apparatus 102 and causes the image forming apparatus 103 to register the IP address of the printing control apparatus 102. It should be noted that in the startup processing of the paper management application 451 of the client computer 101, an IP address of the client computer 101 is notified to the image forming apparatus 103 and the IP address of the client computer 101 is registered in the image forming apparatus 103. When the connection is normally completed, the startup processing of the paper management application proceeds to a step S902.

In the step S902, the controller 300 performs a judging processing of the model of the image forming apparatus 103. In the judging processing of the model, the controller 300 communicates with the image forming apparatus 103 and obtains the model information, which indicates the model of the image forming apparatus 103, from the image forming apparatus 103. Then, the controller 300 judges the model of the image forming apparatus 103 based on model judging information held in advance by the paper management application 351 and obtains basic configuration information of the image forming apparatus 103. The basic configuration information is used in a top screen generating processing executed in a step S908, which will be described later. When the judging processing of the model is completed, the startup processing of the paper management application proceeds to a step S903.

In the step S903, the controller 300 performs a judging processing of options connected to the image forming apparatus 103. In the judging processing of the options, the controller 300 communicates with the image forming apparatus 103 and obtains the hardware option information, which indicates the options connected to the print engine 109 such as the scanner 104 and the finisher 106, from the image forming apparatus 103. The hardware option information is also used in the top screen generating processing executed in the step S908, which will be described later. When the judging processing of the options is completed, the startup processing of the paper management application proceeds to a step S904.

In the step S904, the controller 300 performs a judging processing of the paper feeding unit 120, which is connected to the image forming apparatus 103 and is the target of the paper management. In the judging processing of the paper feeding unit 120, the controller 300 communicates with the image forming apparatus 103 and obtains the paper feeding stage information related to the paper feeding stages constituting the paper feeding unit 120 connected to the image forming apparatus 103 from the image forming apparatus 103. The paper feeding stage information includes, for example, the number of the paper feeding stages, names of the paper feeding stages, paper feeding stage IDs, paper remaining amounts of the paper feeding stages, and information indicating presence/absence of the opening/closing control function for paper feeding stage doors. The controller 300 controls the paper feeding stage management module 354 and records the obtained paper feeding stage information in the paper feeding stage management table (not shown). The paper feeding stage information is also used in the top screen generating processing executed in the step S908, which will be described later. When the judging processing of the paper feeding unit 120 is completed, the startup processing of the paper management application proceeds to a step S905.

In the step S905, the controller 300 obtains the paper information set for the paper feeding stages of the image forming apparatus 103. Specifically, the controller 300 communicates with the image forming apparatus 103 and obtains a plurality of paper IDs set for each paper feeding stage judged by the judging processing of the paper feeding unit 120. Then, the controller 300 records the plurality of paper IDs obtained in the paper feeding stage management table. The plurality of paper IDs is also used in the top screen generating processing executed in the step S908, which will be described later. When obtaining the paper information is completed, the startup processing of the paper management application proceeds to a step S906.

In the step S906, the controller 300 obtains paper list information of the image forming apparatus 103. Specifically, the controller 300 communicates with the image forming apparatus 103 and obtains the paper list information from the image forming apparatus 103. The paper list information includes, for example, paper names, parameters required for printing, favorite IDs, usage histories, and settable paper feeding stage IDs. The controller 300 controls the paper management module 353 and records the obtained paper list information in a paper setting management table (not shown). The paper list information is also used in the top screen generating processing executed in the step S908, which will be described later. When obtaining the paper list information is completed, the startup processing of the paper management application proceeds to a step S907.

In the step S907, the controller 300 executes an application startup environment judging processing of FIG. 10, which will be described later. In the application startup environment judging processing, it is judged whether or not the paper management application 351 starts up on the printing control apparatus 102 directly connected to the image forming apparatus 103. The judgement result obtained in the step S907 is also used in the top screen generating processing executed in the step S908, which will be described later. When the application startup environment judging processing is completed, the startup processing of the paper management application proceeds to a step S908.

In the step S908, the controller 300 executes the top screen generating processing of FIG. 11, which will be described later. In the top screen generating processing, the top screen 500 is generated based on the various kinds of information obtained in the steps S902 to S907. In addition, in the top screen generating processing, the paper list screen 530 is generated based on the paper list information obtained in the step S906. After that, the startup processing of the paper management application ends.

Figure 10:
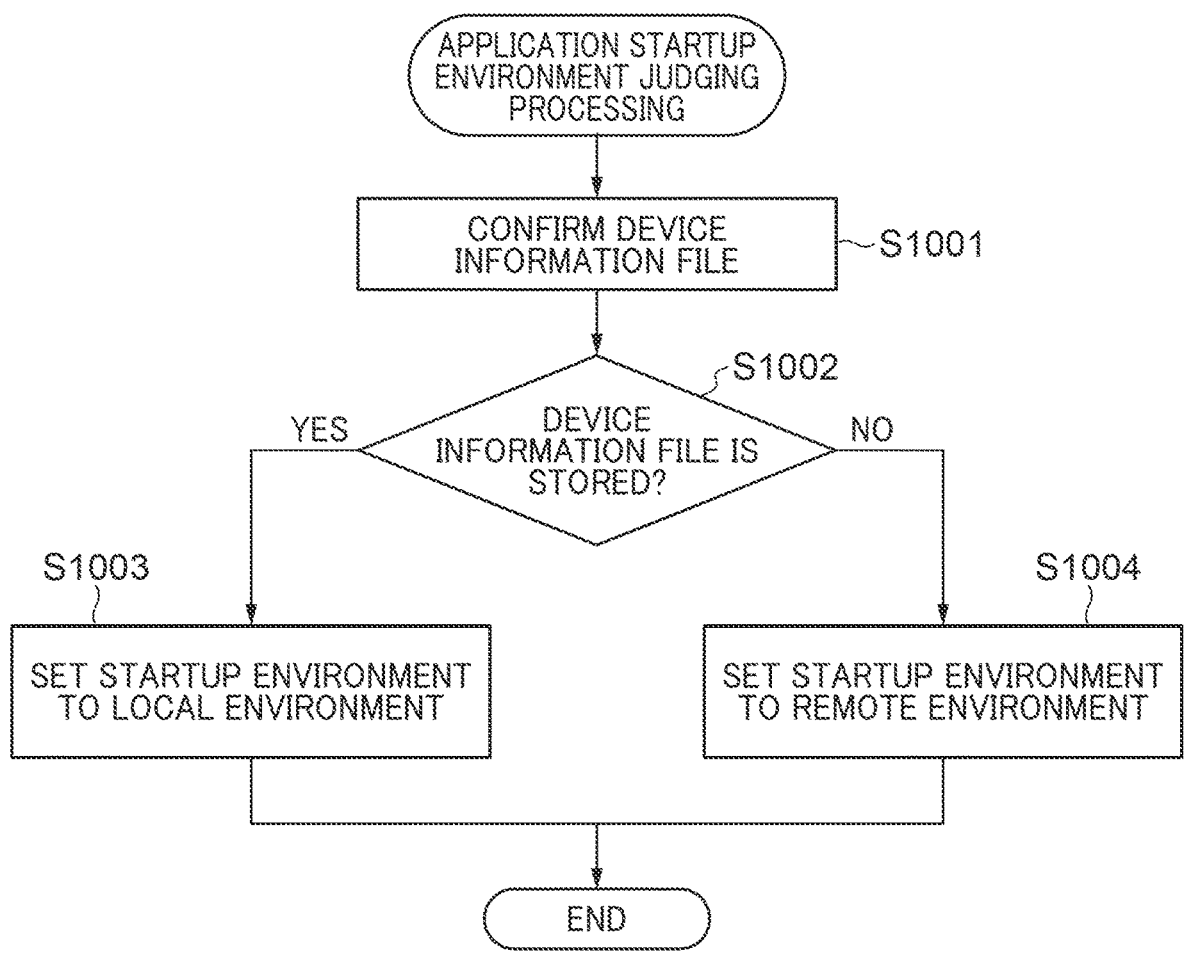
FIG. 10 is a flowchart that shows the procedure of an application startup environment judging processing that is executed in a step S907 of FIG. 9.

FIG. 10 is a flowchart that shows the procedure of the application startup environment judging processing that is executed in the step S907 of FIG. 9.

In a step S1001, the controller 300 confirms the device information file 705 of its own device. Specifically, the controller 300 confirms the device information file 705 by using the absolute path of the server system folder 702 in which the server system is installed or the relative path with respect to the paper management application folder 701.

Next, in a step S1002, the controller 300 judges whether or not the device information file 705 is stored within its own device. Here, as described above, in the printing control apparatus 102 located in close proximity to the image forming apparatus 103, the device information file 705, which is used in the port forwarding function, is stored in the server system folder 702. Therefore, in the step S1002, it is judged that the device information file 705 is stored within its own device. In this way, in the case of being judged that the device information file 705 is stored within its own device, the application startup environment judging processing proceeds to a step S1003.

On the other hand, as described above, the client computer 101 located away from the image forming apparatus 103 does not have the port forwarding function and does not hold the device information file 705. Therefore, in the step S1002 of the startup processing of the paper management application 451 of the client computer 101, it is judged that the device information file 705 is not stored within its own device. In this way, in the case of being judged that the device information file 705 is not stored within its own device, the application startup environment judging processing proceeds to a step S1004.

In the step S1003, the controller 300 sets a startup environment of the paper management application to a local environment, which is a location in close proximity to the image forming apparatus 103. The setting information that sets the startup environment to the local environment is stored in, for example, the external storage device 309 by the setting management module 357. After that, the application startup environment judging processing ends.

In the step S1004, the controller 300 sets the startup environment of the paper management application to a remote environment, which is a location not in close proximity to the image forming apparatus 103. The setting information that sets the startup environment to the remote environment is stored in, for example, the external storage device 309 by the setting management module 357. After that, the application startup environment judging processing ends.

Figure 11:
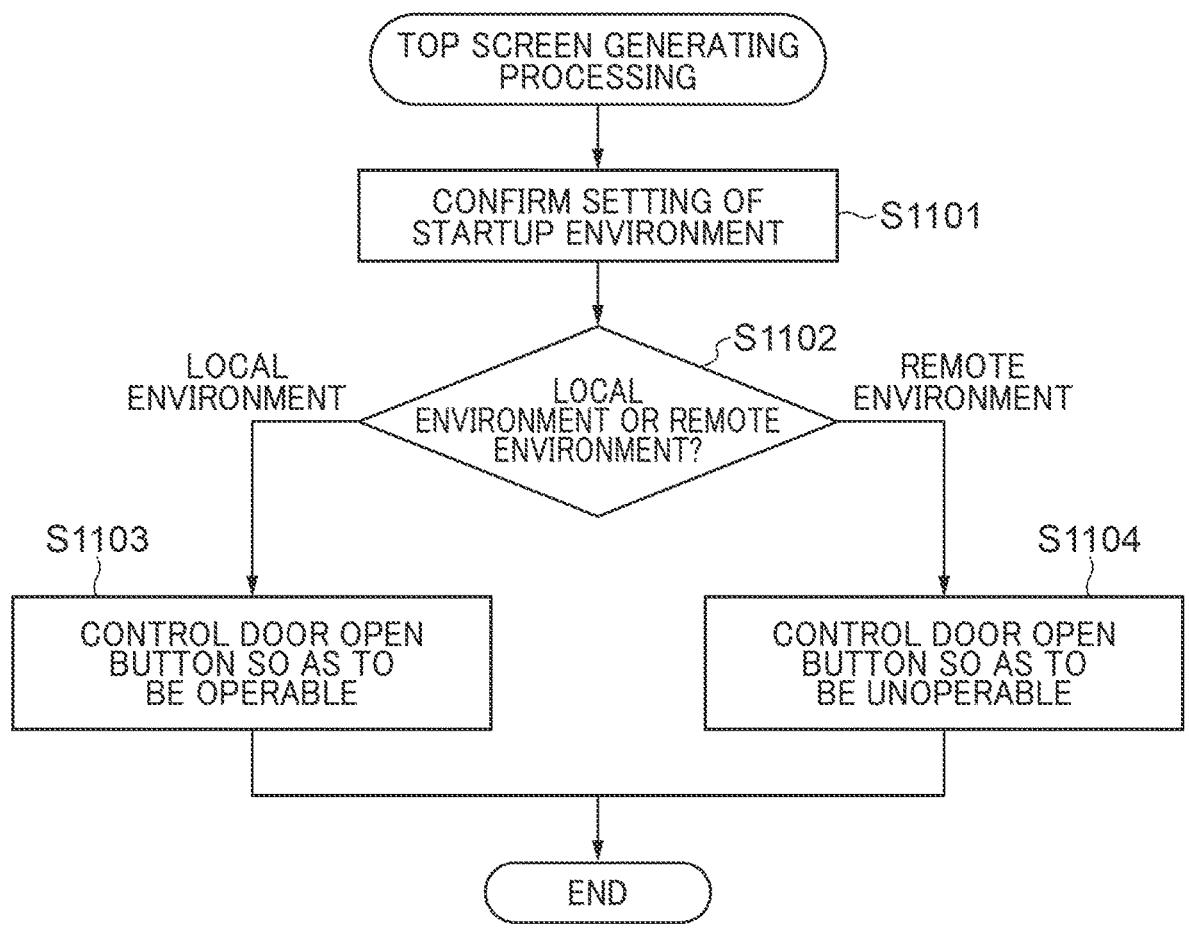
FIG. 11 is a flowchart that shows the procedure of a top screen generating processing that is executed in a step S908 of FIG. 9.

FIG. 11 is a flowchart that shows the procedure of the top screen generating processing that is executed in the step S908 of FIG. 9.

In a step S1101, the controller 300 confirms the setting of the startup environment of the paper management application. Next, in a step S1102, the controller 300 judges whether the startup environment of the paper management application is the local environment or the remote environment. In the case that the startup environment of the paper management application is the local environment, the top screen generating processing proceeds to a step S1103. In the case that the startup environment of the paper management application is the remote environment, the top screen generating processing proceeds to a step S1104.

In the step S1103, the controller 300 controls the door open button so as to be operable. For example, the controller 300 causes each of the paper feeding stage buttons 520a to 520h to display the door open button in an enabled state (for example, see FIG. 5B). The enabled state is, for example, a state in which the controller 300 detects and accepts the selection operation of the door open button performed by the operator.

In the step S1104, the controller 300 controls the door open button so as to be inoperable. For example, the controller 300 causes each of the paper feeding stage buttons 520a to 520h to display the door open button in a disabled state (for example, see FIG. 5C). The disabled state is, for example, a state in which the controller 300 does not accept the selection operation of the door open button performed by the operator. Moreover, in the step S1104, for example, the control may be performed such that the door open button is not displayed, the door open button is displayed in grayed-out, or the door open button is displayed as an icon of another image showing that the door open button is in the disabled state.

Figure 12:
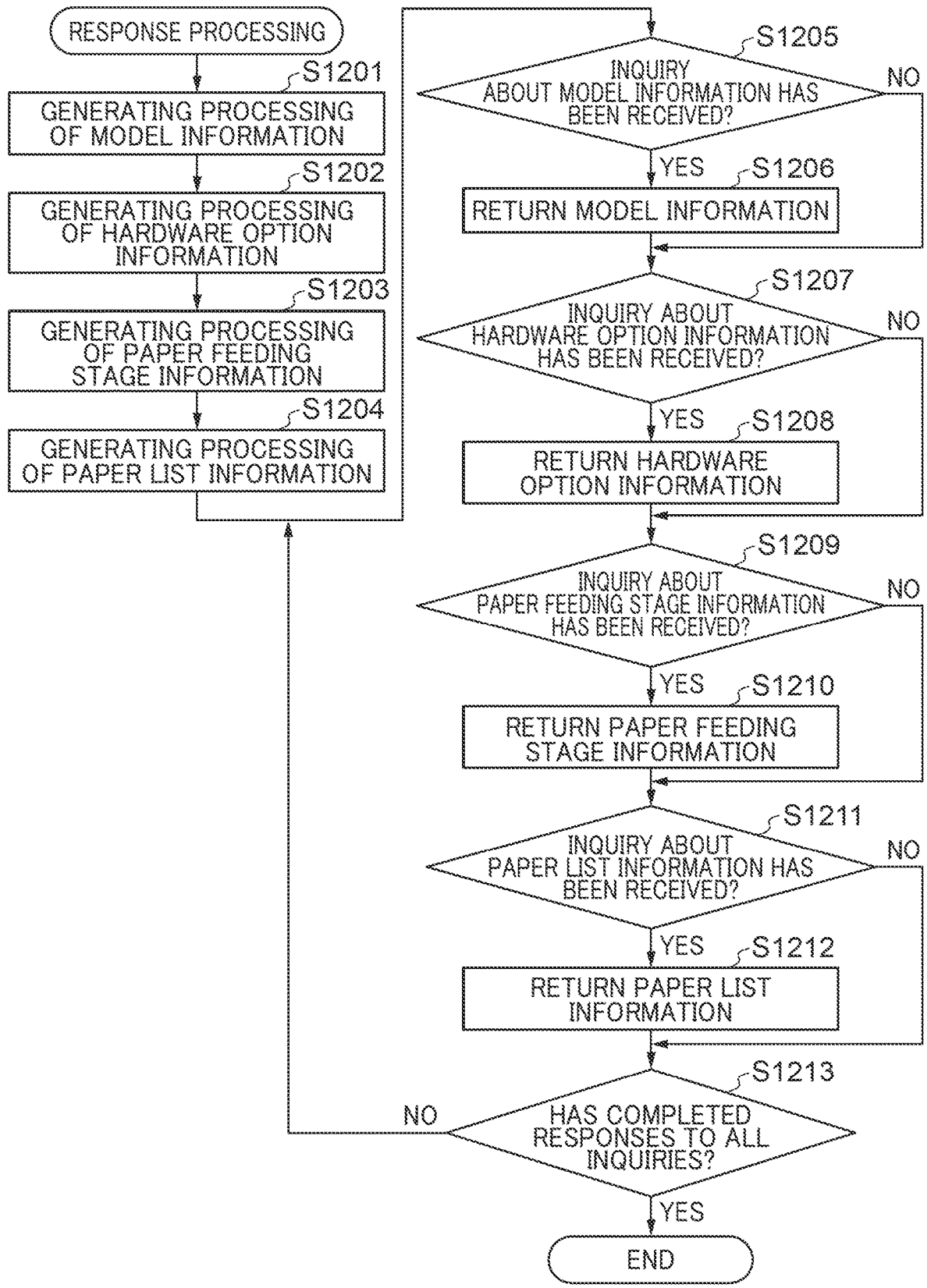
FIG. 12 is a flowchart that shows the procedure of a response processing that is executed by the image forming apparatus of FIG. 1.

FIG. 12 is a flowchart that shows the procedure of a response processing that is executed by the image forming apparatus 103 of FIG. 1. The response processing of FIG. 12 is realized by the CPU 201 of the controller 200 executing a program expanded in the RAM 202 from the external storage device 210.

In a step S1201, the controller 200 performs a generating processing of the model information of the image forming apparatus 103. In the generating processing of the model information, the controller 200 obtains the model information of the image forming apparatus 103 from the external storage device 210 and stores the obtained model information in the RAM 202 in a data format that can be transferred to another device.

Next, in a step S1202, the controller 200 performs a generating processing of the hardware option information, which indicates the options connected to the image forming apparatus 103. In the generating processing of the hardware option information, the controller 200 obtains the hardware option information from the print engine 109 via the printing I/F 207. Then, the controller 200 stores the obtained hardware option information in the RAM 202 in the data format that can be transferred to another device.

Next, in a step S1203, the controller 200 performs a generating processing of the paper feeding stage information related to the paper feeding stages constituting the paper feeding unit 120 connected to the image forming apparatus 103. In the generating processing of the paper feeding stage information, the controller 200 obtains the paper feeding stage information from the print engine 109 via the printing I/F 207, and stores the obtained paper feeding stage information in the RAM 202 in the data format that can be transferred to another device.

Next, in a step S1204, the controller 200 performs a generating processing of the paper list information. In the generating processing of the paper list information, the controller 200 obtains the paper list information from the external storage device 210 and stores the obtained paper list information in the RAM 202 in the data format that can be transferred to another device.

Next, in a step S1205, the controller 200 judges whether or not an inquiry about the model information has been received from the printing control apparatus 102. In the case that the inquiry about the model information has been received from the printing control apparatus 102, the response processing proceeds to a step S1206. On the other hand, in the case that the inquiry about the model information has not been received from the printing control apparatus 102, the response processing proceeds to a step S1207.

In the step S1206, the controller 200 returns the model information stored in the RAM 202 in the step S1201 to the printing control apparatus 102 as a response to the received inquiry. After that, the response processing proceeds to the step S1207.

In the step S1207, the controller 200 judges whether or not an inquiry about the hardware option information has been received from the printing control apparatus 102. In the case that the inquiry about the hardware option information has been received from the printing control apparatus 102, the response processing proceeds to a step S1208. On the other hand, in the case that the inquiry about the hardware option information has not been received from the printing control apparatus 102, the response processing proceeds to a step S1209.

In the step S1208, the controller 200 returns the hardware option information stored in the RAM 202 in the step S1202 to the printing control apparatus 102 as a response to the received inquiry. After that, the response processing proceeds to the step S1209.

In the step S1209, the controller 200 judges whether or not an inquiry about the paper feeding stage information has been received from the printing control apparatus 102. In the case that the inquiry about the paper feeding stage information has been received from the printing control apparatus 102, the response processing proceeds to a step S1210. On the other hand, in the case that the inquiry about the paper feeding stage information has not been received from the printing control apparatus 102, the response processing proceeds to a step S1211.

In the step S1210, the controller 200 returns the paper feeding stage information stored in the RAM 202 in the step S1203 to the printing control apparatus 102 as a response to the received inquiry. After that, the response processing proceeds to the step S1211.

In the step S1211, the controller 200 judges whether or not an inquiry about the paper list information has been received from the printing control apparatus 102. In the case that the inquiry about the paper list information has been received from the printing control apparatus 102, the response processing proceeds to a step S1212. On the other hand, in the case that the inquiry about the paper list information has not been received from the printing control apparatus 102, the response processing proceeds to a step S1213.

In the step S1212, the controller 200 returns the paper list information stored in the RAM 202 in the step S1204 to the printing control apparatus 102 as a response to the received inquiry. After that, the response processing proceeds to the step S1213.

In the step S1213, the controller 200 judges whether or not the responses to all the received inquiries have been completed. In the case that the response to any one of all the received inquiries has not been completed, the response processing returns to the step S1205. On the other hand, in the case that the responses to all the received inquiries have been completed, the response processing ends.

According to the above-described embodiment, in the case that the paper management application is running in the local environment, the operation of the door open button performed by the operator is controlled to be acceptable. As a result, in the local environment that there is a possibility that setting (loading) of the printing paper is performed after setting the paper information, it is possible to perform control so as to make the operation of the door open button performed by the operator acceptable, and the operability can be improved. In addition, in the case that the paper management application is running in the remote environment, the operation of the door open button performed by the operator is controlled to be unacceptable. As a result, in the remote environment that the door open button is not required, it is possible to perform control so as to make the operation of the door open button performed by the operator unacceptable, and it is possible to prevent the erroneous operation performed by the operator. In this way, in the embodiment of the present invention, it is possible to provide an optimal UI according to the startup environment of the paper management application.

Further, in the above-described embodiment, in the case that the device information file 705 is stored within its own device, it is judged that the paper management application is running in the local environment. In the case that the device information file 705 is not stored within its own device, it is judged that the paper management application is running in the remote environment. As a result, it is possible to easily judge whether the paper management application is running in the local environment or in the remote environment by using the device information file 705 (predetermined information) used in the port forwarding function.

Furthermore, in the above-described embodiment, in the case of being judged that the paper management application is running in the local environment, the door open button that accepts the selection operation performed by the operator is displayed. In the case of being judged that the paper management application is running in the remote environment, the door open button that does not accept the selection operation performed by the operator is displayed. As a result, it is possible to improve the operability in the local environment while preventing the erroneous operation performed by the operator in the remote environment.

Moreover, in the above-described embodiment, in the case of being judged that the paper management application is running in the remote environment, the door open button will not be displayed. As a result, it is possible to reliably prevent the erroneous operation performed by the operator in the remote environment.

Furthermore, in the above-described embodiment, the door open button is an operation button that accepts the open instruction of the corresponding paper feeding stage. As a result, it is possible to prevent the open instruction of the paper feeding stage due to the erroneous operation performed by the operator in the remote environment, and it is also possible to improve the operability regarding the open instruction of the paper feeding stage in the local environment.

Although the present invention has been described by using the above-described embodiments, the present invention is not limited to the above-described embodiments. For example, the image forming apparatus 103 may be connected to the LAN 110, and the client computer 101 may directly communicate with the image forming apparatus 103.

Moreover, in the above-described embodiment, in the case that the paper management application is running in the remote environment, although the configuration that controls the door open button so as to be inoperable has been described, the present invention is not limited to this configuration. For example, in the case that the paper management application is running in the remote environment, a confirmation screen 1300 (a setting screen) shown in FIG. 13 may be displayed according to pressing down of the door open button. Here, as an example, a case that any one of door open buttons on the top screen 500 displayed on the display device 114 of the client computer 101 corresponding to the remote environment is pressed down by the operator will be described.

Figure 13:
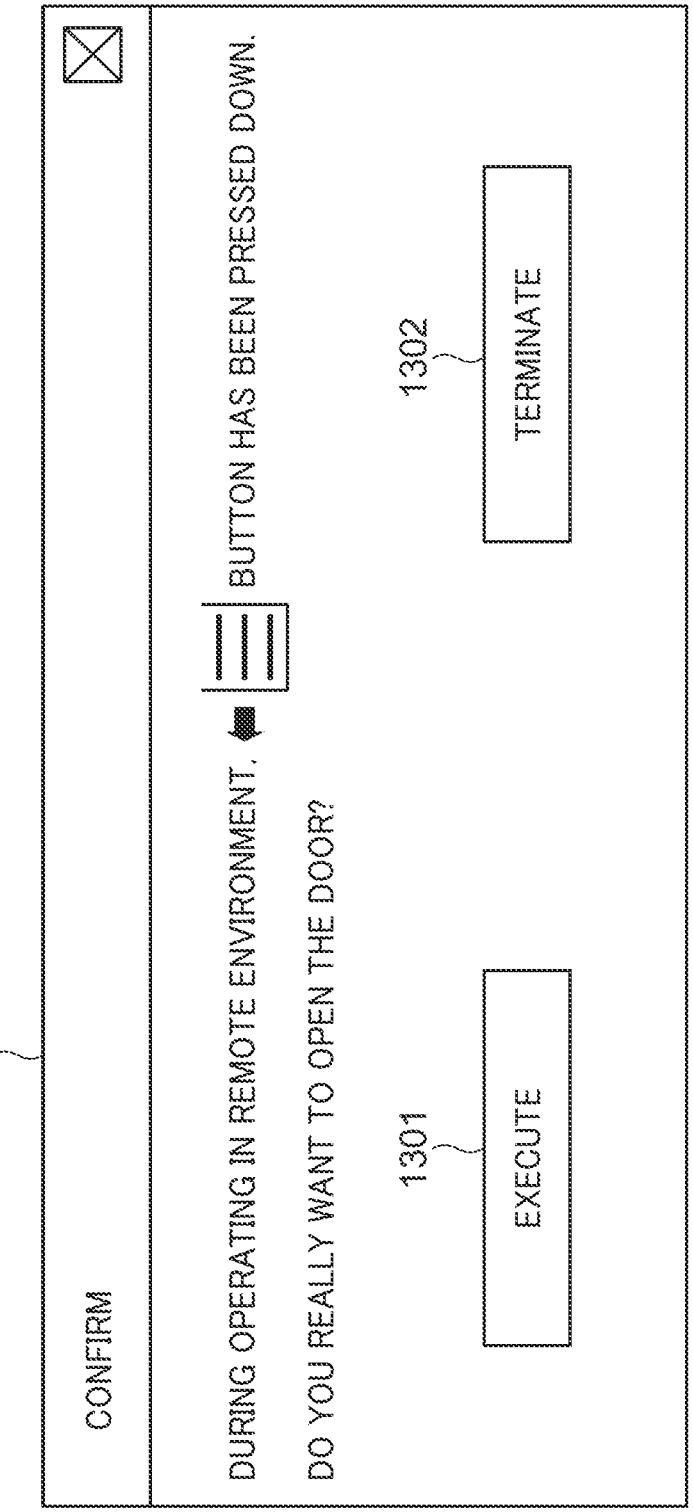
FIG. 13 is a figure that shows an example of a confirmation screen that is displayed on the display device of the client computer of FIG. 1.

FIG. 13 is a figure that shows an example of the confirmation screen 1300 that is displayed on the display device 114 of the client computer 101 of FIG. 1. In the client computer 101, image data drawn into the video memory according to the instruction transmitted from the CPU 401 is outputted as video signals to the display device 114, and the confirmation screen 1300 is displayed on the display device 114 based on the video signals. The confirmation screen 1300 includes a message that asks the user whether or not it is okay to open the paper feeding stage, an execution button 1301, and a termination button 1302.

When the controller 400 detects that the door open button has been pressed down while the paper management application 451 is running in the remote environment, the controller 400 displays the confirmation screen 1300 on the display device 114. When the execution button 1301 is pressed down, the controller 400 transmits the open instruction of the paper feeding stage corresponding to the pressed-down door open button to the image forming apparatus 103, and closes the confirmation screen 1300. When the termination button 1302 is pressed down, the controller 400 closes the confirmation screen 1300 without transmitting the open instruction of the paper feeding stage corresponding to the pressed-down door open button to the image forming apparatus 103.

In this way, in the embodiment described above, in the case that the paper management application is running in the local environment, as the door open button is pressed down, the open instruction of the paper feeding stage corresponding to the pressed-down door open button is transmitted to the image forming apparatus 103. On the other hand, in the case that the paper management application is running in the remote environment, as the door open button is pressed down, the confirmation screen 1300 is displayed that prompts the user to set whether or not to perform the processing corresponding to the pressed-down door open. As a result, in the remote environment, it is possible to prevent the erroneous operation of the door open button performed by the operator by confirming with the operator whether or not it is okay to open the paper feeding stage corresponding to the pressed-down door open button before the open instruction of the paper feeding stage corresponding to the pressed-down door open button is transmitted.

Figure 14:
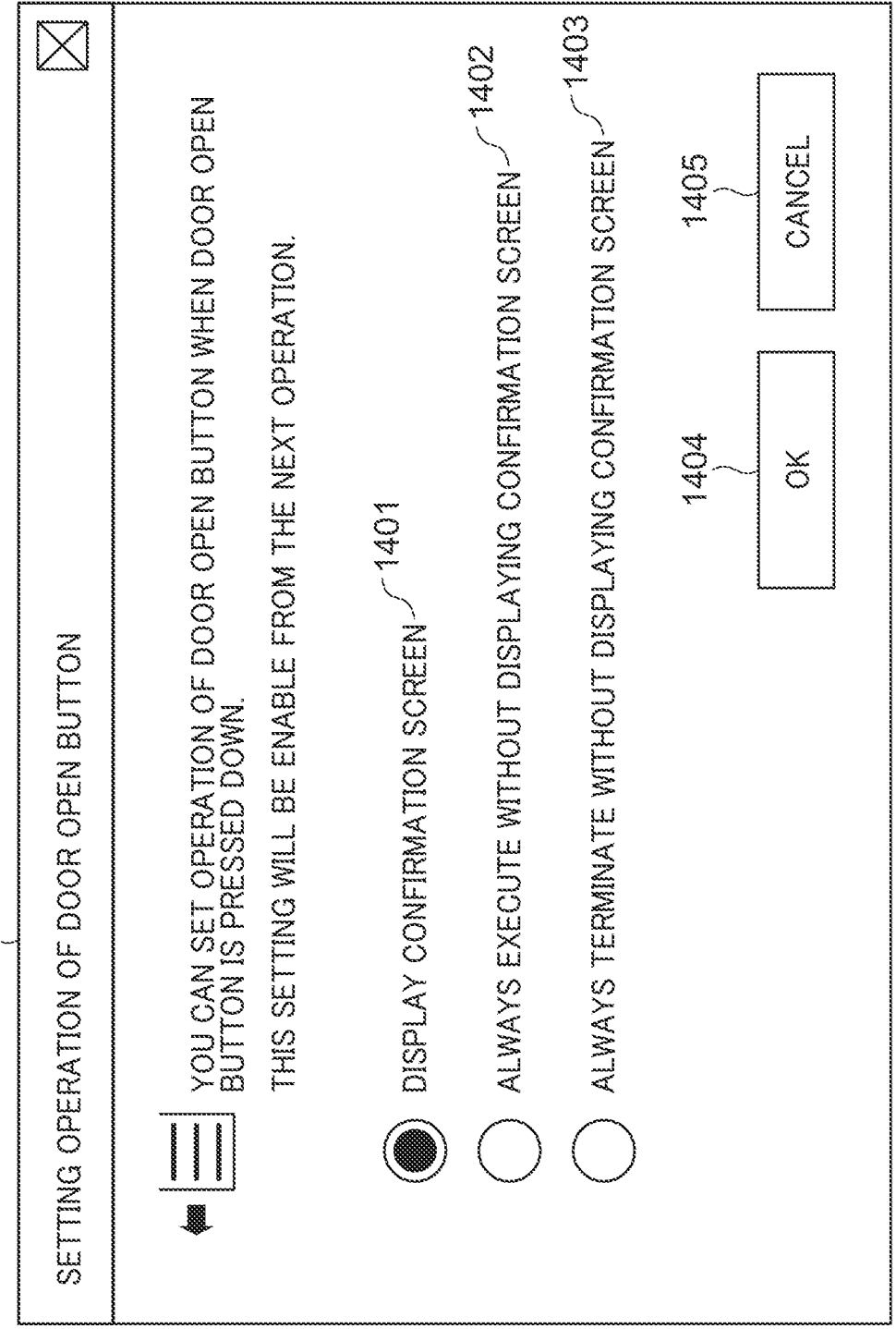
FIG. 14 is a figure that shows an example of an operation setting screen that is displayed on the display device of the client computer of FIG. 1.

Furthermore, in the embodiment described above, the control may be performed whether or not to display the confirmation screen 1300 from the next time onward based on the setting of an operation setting screen 1400 of FIG. 14.

FIG. 14 is a figure that shows an example of the operation setting screen 1400 that is displayed on the display device 114 of the client computer 101 of FIG. 1. In the client computer 101, image data drawn into the video memory according to the instruction transmitted from the CPU 401 is outputted as video signals to the display device 114, and the operation setting screen 1400 is displayed on the display device 114 based on the video signals.

For example, when the execution button 1301 or the termination button 1302 is pressed down for the first time, the controller 400 causes the display device 114 to display the operation setting screen 1400. It should be noted that the display timing of the operation setting screen 1400 is not limited to this timing. For example, the controller 400 may cause the display device 114 to display the operation setting screen 1400 when any one of the door open buttons on the top screen 500 displayed on the display device 114 of the client computer 101 is pressed down for the first time.

The operation setting screen 1400 includes settings 1401 to 1403 regarding the display of the confirmation screen 1300 from the next time onward, an OK button 1404, and a cancel button 1405. The setting 1401 is a setting for "display the confirmation screen". When the setting 1401 is set, the controller 400 causes the display device 114 to display the confirmation screen 1300 in accordance with the pressing down of the door open button from the next time onward. The setting 1402 is a setting for "always execute without displaying the confirmation screen". When the setting 1402 is set, the controller 400 transmits the open instruction to the image forming apparatus 103 without causing the display device 114 to display the confirmation screen 1300 in accordance with the pressing down of the door open button from the next time onward. The setting 1403 is a setting for "always terminate without displaying the confirmation screen". When the setting 1403 is set, in accordance with the pressing down of the door open button from the next time onward, the controller 400 does not cause the display device 114 to display the confirmation screen 1300, and does not transmit the open instruction to the image forming apparatus 103. When the controller 400 detects that the OK button 1404 has been pressed down in a state that any one of the settings 1401 to 1403 has been selected by the operator, the controller 400 stores the selected setting in the external storage device 309. It should be noted that in the case that the previous setting is stored in the external storage device 309, the previous setting is updated to the selected setting. Then, the controller 400 closes the operation setting screen 1400. On the other hand, upon detecting that the cancel button 1405 has been pressed down, the controller 400 closes the operation setting screen 1400 without storing the selected setting in the external storage device 309.

In this way, since whether or not to display the confirmation screen 1300 from the next time onward is controlled based on the setting of the operation setting screen 1400, the operator will not be forced to operate the confirmation screen 1300 many times, and the operability can be improved.

Furthermore, in the embodiment described above, the target whose display is controlled based on the startup environment of the paper management application is not limited to the door open button, and may be, for example, an adjustment execution button (an object) described later.

Figure 15:
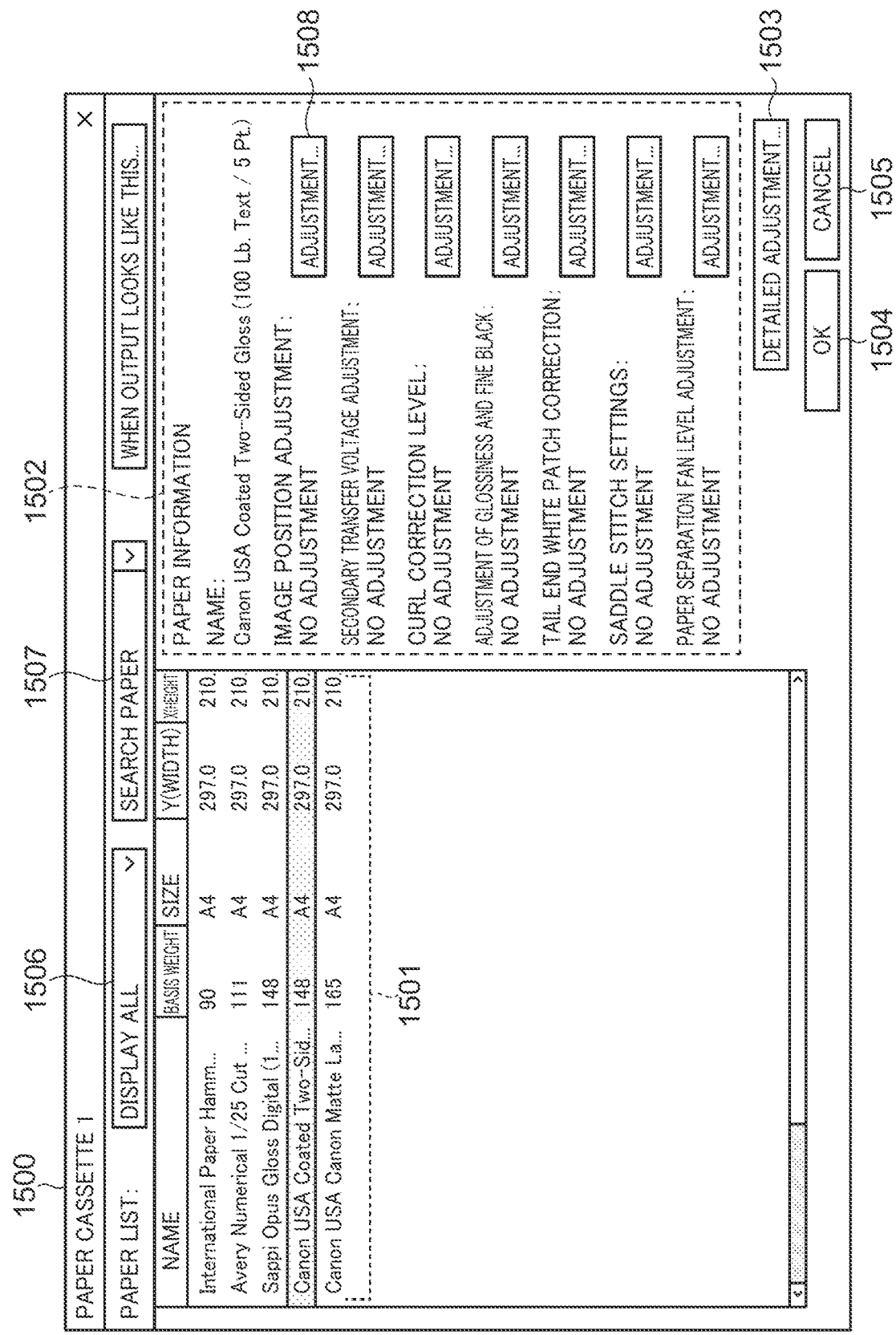
FIG. 15 is a figure that shows an example of a paper feeding stage information screen that is displayed when a paper feeding stage button on the top screen shown in FIG. 5A, FIG. 5B.

FIG. 15 is a figure that shows an example of a paper feeding stage information screen 1500 that is displayed when any one of the paper feeding stage buttons 520a to 520h on the top screen 500 shown in FIG. 5A, FIG. 5B, and FIG. 5C is pressed down. On the paper feeding stage information screen 1500, it is possible to perform the paper setting of the paper feeding stage corresponding to the pressed-down paper feeding stage button, and it is possible to issue an execution instruction to execute an adjustment processing that sets adjustment values of such as a secondary transfer voltage optimized for the set printing paper and an image position optimized for the set printing paper and performs the test printing by using these adjustment values. Here, as an example, a case that the paper feeding stage information screen 1500 is displayed on the display device 111 of the printing control apparatus 102 will be described. In the printing control apparatus 102, image data drawn into the video memory according to the instruction transmitted from the CPU 301 is outputted as video signals to the display device 111, and the paper feeding stage information screen 1500 is displayed on the display device 111 based on the video signals.

The paper feeding stage information screen 1500 includes a paper list display area 1501, a paper information display area 1502, a detailed adjustment button 1503, an OK button 1504, and a cancel button 1505.

The paper list display area 1501 displays a paper list that is a list of the printing paper settable for the paper feeding stage corresponding to the selected paper feeding stage button. The controller 300 generates and draws the paper list in the paper list display area 1501 based on the paper list information obtained in the step S906. On the paper list display area 1501, for example, the currently set printing paper is highlighted so that the operator can easily recognize it.

The controller 300 switches the paper list displayed on the paper list display area 1501 by designating a pull-down menu 1506 or a search input area 1507. The pull-down menu 1506 is a pull-down menu for selecting a display method of the paper list. The pull-down menu 1506 displays options for filtering and displaying the printing paper displayed on the paper list display area 1501. The search input area 1507 is an area for the operator to input keyword(s) for retrieving the desired printing paper from the printing paper displayed on the paper list display area 1501. It is possible to perform an incremental search on the search input area 1507. When character(s) is/are inputted into the search input area 1507, the search is automatically performed.

The paper information display area 1502 displays, for example, information frequently used by the operator among the information about the printing paper selected by the operator. Specifically, the information frequently used by the operator includes the name of the printing paper, and some adjustment items such as image position adjustment, secondary transfer voltage adjustment, curl correction level, adjustment of glossiness and fine black, tail end white patch correction, saddle stitch settings, and paper separation fan level adjustment. Furthermore, the paper information display area 1502 displays whether or not the adjustment value of each adjustment item has been changed from an initial value. For example, "no adjustment" is displayed for the adjustment item that has not been changed from its initial value, and "adjusted" is displayed for the adjustment item that has been changed from its initial value. Moreover, a plurality of adjustment execution buttons that each is used for issuing an execution instruction to execute an adjustment processing corresponding to each adjustment item are displayed on the paper information display area 1502. For example, when the operator selects the adjustment execution button 1508, the execution instruction to execute the adjustment processing of the image position is transmitted to the image forming apparatus 103. The controller 300 obtains detailed information about the target printing paper from the paper list information obtained in the step S906, and generates data to be displayed on the paper information display area 1502 based on the obtained detailed information and draws it.

The detailed adjustment button 1503 is pressed down when confirming information not displayed on the paper information display area 1502 or performing setting change of the information not displayed on the paper information display area 1502. Upon detecting that the detailed adjustment button 1503 has been pressed down, the controller 300 causes the display device 111 to display a screen (not shown) for confirming detailed adjustment information and issuing an adjustment execution instruction.

FIG. 16 is a flowchart that shows the procedure of a paper feeding stage information screen generating processing that is executed by the printing control apparatus 102 of FIG. 1. The paper feeding stage information screen generating processing is realized by the CPU 301 of the controller 300 executing a program expanded in the RAM 302 from the external storage device 309. The paper feeding stage information screen generating processing is executed when the operator presses down any one of the paper feeding stage buttons 520*a* to 520*h* on the top screen 500. It should be noted that the paper feeding stage information screen generating processing is similar to the top screen generating processing of FIG. 11 described above, and the contents different from the top screen generating processing will be described below.

As shown in FIG. 16, the controller 300 performs steps S1601 and S1602, which are the same processes as the steps S1101 and S1102 described above. In the step S1602, in the case of being judged that the startup environment of the paper management application is the local environment, the paper feeding stage information screen generating processing proceeds to a step S1603. On the other hand, in the case of being judged that the startup environment of the paper management application is the remote environment, the paper feeding stage information screen generating processing proceeds to a step S1604.

In the step S1603, the controller 300 controls the adjustment execution button so as to be operable. For example, the controller 300 causes the paper information display area 1502 to display the adjustment execution button in an enabled state. Similar to the step S1103 described above, the enabled state is, for example, a state in which the controller 300 detects and accepts the selection operation of the adjustment execution button performed by the operator. After that, the paper feeding stage information screen generating processing ends.

In the step S1604, the controller 300 controls the adjustment execution button so as to be inoperable. For example, the controller 300 causes the paper information display area 1502 to display the adjustment execution button in a disabled state. Similar to the step S1104 described above, the disabled state is, for example, a state in which the controller 300 does not accept the selection operation of the adjustment execution button performed by the operator. Moreover, in the step S1604, for example, the control may be performed such that the adjustment execution button is not displayed, the adjustment execution button is displayed in grayed-out, or the adjustment execution button is displayed as an icon of another image showing that the adjustment execution button is in the disabled state. After that, the paper feeding stage information screen generating processing ends.

It should be noted that in FIG. 16, as an example, although a case that the printing control apparatus 102 executes the paper feeding stage information screen generating processing has been described, the client computer 101 is also able to execute the paper feeding stage information screen generating processing. In this case, the paper feeding stage information screen generating processing is realized by the CPU 401 of the controller 400 executing a program expanded in the RAM 402 from the external storage device 408.

By executing the paper feeding stage information screen generating processing described above, it is possible to prevent the execution instruction of the adjustment processing due to the erroneous operation performed by the operator in the remote environment, and it is also possible to improve the operability regarding the execution instruction of the adjustment processing in the local environment.

In addition, similar to the control of the door open button described above, the control may be performed so as to display another confirmation screen, which confirms whether or not it is okay to perform the adjustment processing before transmitting the execution instruction of the adjustment processing corresponding to the adjustment execution button to the image forming apparatus 103 according to pressing down of the adjustment execution button.

Furthermore, similar to the operation setting screen 1400, the control may be performed whether or not to display the another confirmation screen from the next time onward based on the setting of another operation setting screen, which includes a plurality of settings related to the display of the another confirmation screen from the next time onwards.

Moreover, in the above-described embodiment, in the case that the paper management application is running in the local environment and the operation of the paper management application is an operation performed by remote access from another device, the door open button and/or the adjustment execution button may be controlled so as to be inoperable.

Here, as a function of the operating system on which the paper management application is running, there is a function of remotely accessing from another computer and operating the screen. For example, there is a remote desktop function included in the Microsoft Windows operating system. By using such a function, for example, the operator B is able to remotely access the printing control apparatus 102 from the client computer 101 and operate the paper management application 351 running on the printing control apparatus 102. In the case of remotely accessing the printing control apparatus 102 from the client computer 101 and operating the paper management application 351 as described above, in the above-described embodiment, it is judged that the startup environment of the paper management application is the local environment. In other words, even in such a case, since the operator is away from the image forming apparatus 103, he/she does not immediately perform setting (loading) the printing paper in the paper feeding stage and/or confirming a printed matter of the test printing, and he/she will not use the door open button and/or the adjustment execution button. Rather, even in such a case, if the door open button and the adjustment execution button are displayed, there is a risk of causing the erroneous operation performed by the operator.

In order to deal with this issue, in the embodiment of the present invention, in the case that the paper management application is running in the local environment and the operation of the paper management application is the operation performed by remote access from another device, the door open button and/or the adjustment execution button are controlled so as to be inoperable.

FIG. 17 is a flowchart that shows another procedure of the application startup environment judging processing that is executed in the step S907 of FIG. 9. It should be noted that the application startup environment judging processing of FIG. 17 is similar to the application startup environment judging processing of FIG. 10 described above, and the contents different from the application startup environment judging processing of FIG. 10 described above will be described below. Further, similar to the application startup environment judging processing of FIG. 10 described above, the application startup environment judging processing of FIG. 17 is executed by the client computer 101 or the printing control apparatus 102 having the paper management application. The application startup environment judging processing of FIG. 17 has the same contents in both the client computer 101 and the printing control apparatus 102. For this reason, as an example, a case that the printing control apparatus 102 executes the application startup environment judging processing of FIG. 17 will be described below. The application startup environment judging processing of FIG. 17 is realized by the CPU 301 of the controller 300 executing a program expanded in the RAM 302 from the external storage device 309.

As shown in FIG. 17, the controller 300 performs steps S1701 and S1702, which are the same processes as the steps S1001 and S1002. In the step S1702, in the case of being judged that the device information file 705 is not stored within its own device, the application startup environment judging processing of FIG. 17 proceeds to a step S1705, which is the same process as the step S1004. When the step S1705 is completed, the application startup environment judging processing of FIG. 17 ends. On the other hand, in the step S1702, in the case of being judged that the device information file 705 is stored within its own device, the application startup environment judging processing of FIG. 17 proceeds to a step S1703.

In the step S1703, the controller 300 judges whether or not the operation of the paper management application is the operation performed by remote access from another device. For example, in the printing control apparatus 102, the Windows API (Application Programming Interface) judges whether the paper management application is running in a remote session or on the console of the printing control apparatus 102. In the case of being judged that the paper management application is running in the remote session, the controller 300 judges that the operation of the paper management application is the operation performed by remote access from another device. On the other hand, in the case of being judged that the paper management application is running on the console of the printing control apparatus 102, the controller 300 judges that the operation of the paper management application is not the operation performed by remote access from another device. In the step S1703, in the case of being judged that the operation of the paper management application is not the operation performed by remote access from another device, the application startup environment judging processing of FIG. 17 proceeds to a step S1704, which is the same process as the step S1003. That is, the controller 300 sets the startup environment of the paper management application to the local environment. The setting information that sets the startup environment to the local environment is stored in, for example, the external storage device 309 by the setting management module 357. After that, the application startup environment judging processing of FIG. 17 ends.

In the step S1703, in the case of being judged that the operation of the paper management application is the operation performed by remote access from another device, the application startup environment judging processing of FIG. 17 proceeds to the step S1705. That is, the controller 300 sets the startup environment of the paper management application to the remote environment. The setting information that sets the startup environment to the remote environment is stored in, for example, the external storage device 309 by the setting management module 357. After that, the application startup environment judging processing of FIG. 17 ends.

By executing the application startup environment judging processing of FIG. 17 described above, it is possible to prevent the erroneous operation performed by the operator when the paper management application 351 of the printing control apparatus 102 is operated by remote access from another device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-204535, filed Dec. 16, 2021, which is hereby incorporated by reference herein in its entirety.

What is claimed is:

1. A non-transitory computer-readable storage medium storing a control program for causing a computer to execute a process that controls a printing apparatus including at least one sheet storage unit, the process comprising:

in a case that an application for operating the printing apparatus is running on a printing control apparatus directly connected to the printing apparatus, causing a display unit of the printing control apparatus to display a screen corresponding to the application, wherein the screen accepts an instruction for opening the sheet storage unit; and in a case that the application is running on an information processing apparatus connected to the printing apparatus via the printing control apparatus, causing a display unit of the information processing apparatus to display a screen corresponding to the application, wherein the screen restricts accepting an instruction for opening the sheet storage unit.

2. The non-transitory computer-readable storage medium according to claim 1, wherein in the process, in a case that predetermined information used in a function to forward received data is stored in the printing control apparatus running the application, the screen corresponding to the application accepts the instruction for opening the sheet storage unit, and in a case that the predetermined information is not stored in the information processing apparatus running the application, the screen restricts accepting the instruction for opening the sheet storage unit.

3. The non-transitory computer-readable storage medium according to claim 1, wherein the process further comprises in a case that the application is running on the information processing apparatus and the instruction for opening the sheet storage unit is inputted in the screen corresponding to the application, causing the display unit of the information processing apparatus to display a selection screen, which allows a user to select whether or not to open the sheet storage unit.

4. The non-transitory computer-readable storage medium according to claim 1, wherein the process further comprises in a case that the application is running on the information processing apparatus and the instruction for opening the sheet storage unit is inputted in the screen corresponding to the application, causing the display unit of the information processing apparatus to display a setting screen, which sets whether or not to open the sheet storage unit when the the instruction for opening the sheet storage unit is inputted in the screen next time.

5. The non-transitory computer-readable storage medium according to claim 1, wherein the process further comprises in a case that the application is running on the printing control apparatus, judging whether the application is being operated via the operation unit of the printing control apparatus or the application is being operated by the information processing apparatus, and wherein in the process, in a case of being judged that the application is running on the printing control apparatus and the application is being operated via an operation unit of the printing control apparatus, the screen corresponding to the application accepts an instruction for opening the sheet storage unit, and in a case of being judged that the application is running on the printing control apparatus and the application is being operated by the information processing apparatus, the screen corresponding to the application restricts accepting an instruction for opening the sheet storage unit.

6. A control method that controls a printing apparatus including at least one sheet storage unit, the control method comprising:

in a case that an application for operating the printing apparatus is running on a printing control apparatus directly connected to the printing apparatus, causing a display unit of the printing control apparatus to display a screen corresponding to the application, wherein the screen accepts an instruction for opening the sheet storage unit; and in a case that the application is running on an information processing apparatus connected to the printing apparatus via the printing control apparatus, causing a display unit of the information processing apparatus to display a screen corresponding to the application, wherein the screen restricts accepting an instruction for opening the sheet storage unit.

* * * * *